(12) United States Patent
Wang et al.

(10) Patent No.: US 12,160,810 B2
(45) Date of Patent: Dec. 3, 2024

(54) METHOD AND DEVICE FOR ROUTING DATA PACKET, AND METHOD AND DEVICE FOR CONTROLLING DATA PACKET TRANSMISSION

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 17/625,544

(22) PCT Filed: Jul. 10, 2020

(86) PCT No.: PCT/KR2020/009080
§ 371 (c)(1),
(2) Date: Jan. 7, 2022

(87) PCT Pub. No.: WO2021/006691
PCT Pub. Date: Jan. 14, 2021

(65) Prior Publication Data
US 2022/0286938 A1 Sep. 8, 2022

(30) Foreign Application Priority Data

Jul. 10, 2019 (CN) .......................... 201910621862.9
Nov. 7, 2019 (CN) .......................... 201911084318.1
Mar. 27, 2020 (CN) .......................... 202010231396.6

(51) Int. Cl.
H04W 40/22 (2009.01)
H04W 40/34 (2009.01)
H04W 84/04 (2009.01)

(52) U.S. Cl.
CPC .......... H04W 40/22 (2013.01); H04W 40/34 (2013.01); *H04W 84/042* (2013.01)

(58) Field of Classification Search
None
See application file for complete search history.

(56) References Cited

U.S. PATENT DOCUMENTS 7,899,053 B2  3/2011  Liu et al.
8,149,726 B2  4/2012  Wei
(Continued)

FOREIGN PATENT DOCUMENTS

CN  101998679 A  3/2011
CN  104581816 A  4/2015
(Continued)

OTHER PUBLICATIONS

International Search Report and Written Opinion of the International Searching Authority in connection with International Application No. PCT/KR2020/009080 issued Oct. 15, 2021, 7 pages.
(Continued)

*Primary Examiner* — Brian S Roberts

(57) ABSTRACT

The present disclosure relates to a pre-5th-Generation (5G) or 5G communication system to be provided for supporting higher data rates Beyond 4th-Generation (4G) communication system such as Long Term Evolution (LTE). The embodiments of the present application provide a method and a device for routing a data packet, and a method and a device for controlling a data packet transmission. The data packet routing method includes: receiving a first message transmitted by a first node; and determining a transmission path of the data packet according to the first message. The method provided in the present application achieves that a node in a relay network can determine a condition for transmitting the data packet by using other transmission
(Continued)

paths, thereby effectively using multiple transmission paths to implement the data packet transmission.

12 Claims, 28 Drawing Sheets

(56) References Cited

U.S. PATENT DOCUMENTS

| | | | |
|---|---|---|---|
| 10,271,232 | B2 | 4/2019 | Marinier et al. |
| 11,284,327 | B2* | 3/2022 | Cho .................... H04L 45/28 |
| 11,350,305 | B2* | 5/2022 | Kim ..................... H04W 72/27 |
| 2008/0002610 | A1 | 1/2008 | Zheng et al. |
| 2012/0020278 | A1 | 1/2012 | Moberg et al. |
| 2012/0140697 | A1 | 6/2012 | Chen et al. |
| 2017/0289976 | A1 | 10/2017 | Lai et al. |
| 2019/0159277 | A1 | 5/2019 | Zhu et al. |
| 2020/0137659 | A1 | 4/2020 | Zhu et al. |
| 2022/0248495 | A1* | 8/2022 | Mildh ................... H04W 76/27 |

FOREIGN PATENT DOCUMENTS

| | | |
|---|---|---|
| CN | 109219102 A | 1/2019 |
| CN | 109729549 A | 5/2019 |
| JP | 2004166089 A | 6/2004 |
| WO | 2006121282 A1 | 11/2006 |

OTHER PUBLICATIONS

3GPP TS 38.473 V15.6.0 (Jul. 2019) 3rd Generation Partnership Project; Technical Specification Group Radio Access Network; NG-RAN; F1 application protocol (F1AP) (Release 15), Jul. 2019, 220 pages.
China National Intellectual Property Administration, "Office Action," issued Mar. 29, 2023, in connection with Chinese Patent Application No. 202010231396.6, 16 pages.
Office Action issued Jun. 24, 2024, in connection with Japanese Patent Application No. 2022-501313, 5 pages.
Kyocera "Consideration of multi-hop RLC ARQ," 3GPP TSG-RAN WG2 Meeting #106, R2-1906651, May 2019, 5 pages.
Huawei et al., "Lossless data delivery," 3GPP TSG-RAN WG2 Meeting #106, R2-1906971, May 2019, 6 pages.

* cited by examiner

METHOD AND DEVICE FOR ROUTING DATA PACKET, AND METHOD AND DEVICE FOR CONTROLLING DATA PACKET TRANSMISSION

CROSS-REFERENCE TO RELATED APPLICATIONS

This application is a 371 of International Application No. PCT/KR2020/009080 filed Jul. 10, 2020, which claims priority to Chinese Patent Application No. 201910621862.9 filed Jul. 10, 2019, Chinese Patent Application No. 201911084318.1 filed on Nov. 7, 2019, and Chinese Patent Application No. 202010231396.6 filed on Mar. 27, 2020, the disclosures of which are herein incorporated by reference in their entirety.

BACKGROUND

1. Field

The present application relates to the field of wireless communication technologies, and particularly, the present application relates to a method and a device for routing a data packet, and a method and a device for controlling a data packet transmission.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the NR (New Radio access) network or the fifth generation (5G) network, in order to extend the coverage of the network, the IAB (Integrated Access and Backhaul) project is proposed. The main purpose of this project is to build a multi-hop relay network architecture. As shown in FIG. 1, a multi-hop relay network architecture including a donor node (IAB donor) and two relay nodes (IAB nodes) is shown in FIG. 1. Users 1/2/3 access the relay network through the distributed unit of the donor node, the distributed unit part of the relay node 1, and the distributed unit part of the relay node 2. The donor node can be an independent base station, or it can be composed of a central unit (CU) (IAB-donor central unit) and a distributed unit (DU) (IAB-donor distributed unit), where the interface between the central unit and the distributed unit is an F1 interface (see 3GPP TS38.473), the protocol stack included in the central unit includes: the protocol stack serving the control plane includes the radio resource control (RRC) protocol layer and the packet data convergence protocol (PDCP) layer, and the protocol stack serving the user plane includes service data adaptation protocol (SDAP) layer and PDCP layer; the protocol stacks included in the distributed unit are: the protocol stacks serving the control plane and user plane include the radio link control (RLC) protocol layer, the medium access control (MAC) protocol layer, and the physical layer (PHY). The relay node includes a mobile terminal part and a distributed unit part, wherein the mobile terminal part is used to communicate with a node above the relay node (for example, the mobile terminal part of the relay node 1 is used to communicate with the donor node or the distributed unit of the donor node, and the mobile terminal part of relay node 2 is used to communicate with the distributed unit part of relay node 1), and the distributed unit part is used to communicate with the next level node of the relay node (such as the distributed unit part of the relay node 1 is used to communicate with user 2 and may also be used to communicate with the mobile terminal part of the relay node 2). The distributed unit part of the relay node includes protocol stacks such as RLC, MAC and PHY. The link between the relay node and the donor node or the distributed unit of the donor node, or between the relay nodes is a backhaul link, and one or more different backhaul link channels will be established on the backhaul link, such as backhaul link channel 1 and backhaul link channel 2 in FIG. 1. An example of the backhaul link channel is a backhaul link Radio Link Control (RLC) Protocol channel, that is a Backhaul RLC channel. In a relay network, each backhaul link channel will be used to transmit data packets that belong to the same user radio bearer or different user radio bearers. The user radio bearer can be a data radio bearer (DRB), or a signaling radio bearer (SRB), or may be a control plane signaling of an F1 interface, or may be a user plane data of an F1 interface.

In the multi-hop relay network, a new protocol layer is defined, that is the backhaul adaptation protocol layer (BAP). This protocol layer is configured in the distributed units of the donor node and the relay node. Its main role is the data packet routing and the data packet mapping. Data packet routing refers to transmitting the received data packet to the correct next hop node so that it can be received by the destination receiving node of the data packet (the destination receiving node can be a relay node, a donor node, or the distributed unit of the donor node, or the central unit of the donor node. If it is a relay node, it means that the data packet is the data packet of the relay node, for example, the data packet of the control signaling of the F1 interface needs to be received by the distributed unit of the relay node, or the data packet of the user accessing the relay node). Data packet mapping refers to transmitting data packets through the correct backhaul link channel. When the distributed unit of the relay node or each relay node performs data packet routing, it reads the information related to routing in the data packet and determines which node the data packet should be transmitted to according to the configured routing table. The information related to routing in the data packet includes at least one of the following information: 1) routing identification information (for example, routing ID, BAP routing ID); 2) identification information or address information of a destination receiving node (for example, a destination address, BAP Address); 3) Path identification information (Path ID). In one embodiment, the transmission path represented by the identification information may be an end-to-end path from the source transmitting node to the destination receiving node of the data packet, that is, the transmission path represents the data packet is transmitted through the source node (the source node can be the donor node, or the central unit of the donor node, or the distributed unit of the donor node), one or more intermediate nodes, and the destination receiving node; in another embodiment, the transmission path represented by the identification information may be the next hop node of the data packet. If the identification information of the transmission path is different, the next hop node may be the same or different. In one embodiment, the routing identification information may be composed of identification information or address information (for example, BAP address) of a destination receiving node and identification information of a path. In another embodiment, the routing identification information may be used to indicate a destination receiving node and a path identification. The routing table includes at least one of the following information: 1) routing identification information; 2) identification information or address information (for example, BAP address) of a destination receiving node; 3) path identification information; 4) identification information or address information (for example, BAP address) of the next hop node. The following uses FIG. 2 as an example to describe the data packet routing method in a relay network. The address information (for example, BAP address) of the relay nodes 1/2/3/4 are the addresses 1/2/3/4, respectively. Three data packets (data packets 1/2/3) are transmitted from the central unit of the donor node to the relay node 4 (the relay node 4 is the destination receiving node for these data packets). When the distributed unit of the donor node transmits the above three data packets to the relay node 1, the information contained in each data packet is shown in Table 1: Information contained in the packet

TABLE 1

| Data packet 1 | BAP address = address 4 | Path ID = 1 |
| Data packet 2 | BAP address = address 4 | Path ID = 2 |
| Data packet 3 | BAP address = address 4 | Path ID = 1 |

After receiving the above three data packets, the relay node 1 will perform the following processes: 1) For data packet 1: the relay node 1 acquires the data packet with a BAP address of address 4 and a path ID of 1. According to the routing table of the relay node 1, it can be determined that the next hop node of the data packet is the relay node 2, then the relay node 1 transmits the data packet 1 to the relay node 2.

2) For data packet 2: the relay node 1 acquires the data packet with a BAP address of address 4 and a Path ID 2. According to the routing table of the relay node 1, it can be determined that the next hop of the data packet is the relay node 3, then the relay node 1 transmits the data packet 2 to the relay node 3.

3) For data packet 3: the relay node 1 acquires the data packet with a BAP address of address 4 and a Path ID 1. According to the routing table of the relay node 1, the relay node 1 learns that the next hop node of the data packet transmitted to the relay node 4 may be the relay node 2, or may be the relay node 3. If the data packet is transmitted to the relay node 2, then its corresponding Path ID is 1, and if the data packet is transmitted to the relay node 3, then its corresponding Path ID is 2. In this case, the relay node 1 can transmit the data packet 3 to the relay node 3. When the relay node 1 receives the data packet 3, the path ID contained in the data packet is 1, according to the information, the relay node 1 needs to transmit it to the relay node 2. However, since the relay node 1 decides to transmit the data packet to the relay node 3 instead of the relay node 2, the relay node can modify the Path ID contained in the data packet 3 from 1 to 2 and transmit the data packet 3 to the relay node 3.

Similarly, after receiving the data packet 1, the relay node 2 will transmit the data packet 1 to the relay node 4 according to its routing table. After receiving the data packets 2 and 3, the relay node 3 will transmit the data packets 2 and 3 to the relay node 4 according to its routing table.

In the above example, if the routing table of a node indicates that there are multiple alternative paths to a destination receiving node, the node may change the transmission path of the data packet (modify the information related to the transmission path contained in the data packet).

According to the description of the above example, the routing mechanism of the data packet in the relay network can be summarized as:

1) The routing of the data packet is determined according to the routing information contained in the data packet and the routing table at the nodes in the relay network.

2) After receiving a data packet, a node in the relay network (for example, a relay node or a distributed unit of the donor node) determines the next hop node of the data packet according to the routing information in the data packet and the routing table stored at the node.

3) The nodes in the relay network (for example, the relay node or the distributed unit of the donor node) can change the transmission path of the data packet. If the routing table of a node in the relay network indicates that the data packets transmitted to the same destination receiving node have multiple different next hop nodes (that is, the data packets transmitted to the same destination receiving node at this node can be transmitted through different next hop nodes and finally reaches the destination receiving node through the different next hop nodes), the node may change the transmission path of the data packet. As shown in FIG. 2, for a data packet whose destination receiving node is the relay node 4, the relay node 1 can transmit the data packet to the relay node 2, or can transmit the data packet to the relay node 3, and the relay node 1 changes the transmission path of the data packet 3. Further, when a node in the relay network changes the transmission path of the data packet, it can change the routing information in the data packet (as shown in FIG. 2, the Path ID in data packet 3 changes from 1 to 2).

SUMMARY

The existing technology has the following problems:

1) The nodes in the relay network may change the transmission path of the data packet (this change in the transmission path can still ensure that the data packet can be transmitted to the same destination receiving node). The reasons for the change in the transmission path of this node may be: load balancing, problems with the transmission path of the data packet (such as poor signal quality, the RLF on the link, and the congestion on the link). There are other reasons not excluded. However, the prior art does not define a mechanism for controlling such a transmission path change. If a node in a relay network arbitrarily modifies a transmission path of a data packet, it will cause an imbalance in network load and a waste of network resources.

2) If the nodes in the relay network change the transmission path of the user data, it means that the data with the same destination receiving node will be transmitted to the destination receiving node through different transmission paths. In the prior art, the donor node or the central unit of the donor node cannot learn the data volume information of the data transmitted through different transmission paths, which is disadvantageous for the donor node or the central unit of the donor node to select an appropriate transmission path for the user data. Meanwhile, it is also not conducive to control the data transmission (for example, flow control) by the donor node or the central unit of the donor node.

3) In the prior art, a node in a relay network can transmit data packets to the same destination receiving node through different transmission paths. When a radio link failure (RLF) occurs on a backhaul link in the relay network, all data packets passing through the link cannot be transmitted. If other nodes in the relay network can learn the backhaul link where the RLF occurs, the other node can change the transmission path of the user data to avoid the backhaul link where the RLF occurs, thereby ensuring the continued transmission of user data. However, the prior art cannot let other nodes in the relay network learn the backhaul link where the RLF occurs, and the nodes in the relay network cannot change the data transmission path, which may cause keeping transmitting user data through the backhaul link where the RLF occurs, thereby causing that the user data cannot reach the destination receiving node continuously.

4) In the prior art, a relay node may access the network through two or more parent nodes (nodes to which the mobile terminal part of the relay node is connected), or a node directly or indirectly connected to one relay node may access to the network through two or more parent nodes. In this case, the user data may be transmitted to the relay node through different transmission paths. Generally, for one DRB data served by a relay node, a tunnel is established between the central unit of the donor node and the distributed unit of the relay node for the DRB. However, when there are multiple transmission paths between the central unit of the donor node and the distributed unit of the relay node, it may be necessary to establish two or more tunnels for the DRB, and data on different tunnels will be transmitted to the relay node through different transmission paths. In the prior art, if for the purpose of one DRB, two tunnels are established between the central unit of the donor node and the distributed unit of the relay node, the distributed unit of the relay node needs to establish two different RLC entities for the DRB, and each RLC entity will configure corresponding logical channels, and also configure one or more cells serving each RLC entity and the corresponding logical channels. The purpose of this configuration is to support the PDCP duplication function (one packet of the PDCP layer will be duplicated into two packets, and the central unit of the base station will transmit the two packets to the distributed unit part of the base station through the two different tunnels, and then the two packets will be transmitted to the user through the two different RLC entities, two different logical channels and different cells, for the purpose of providing the reliability of data transmission). However, in a relay network, even if the PDCP duplication function is not enabled, two or more tunnels may be established for a DRB between the central unit of the donor node and the distributed unit part of the relay node. This is because the data of the DRB will be transmitted to the relay node through different transmission paths. However, the prior art needs to configure two RLC entities for the DRB, which causes a waste of resources of the distributed unit part of the relay node, and limits the transmission of the DRB data.

5) In the prior art, a relay node may access a central unit of a donor node through two or more distributed units of donor node(s). The relay node may be directly connected with the distributed unit of each donor node or indirectly connected with the distributed unit of each donor node through one or more other relay nodes. After the central unit of the donor node determines the transmission path of the downlink data, it needs that the relay node determines the downlink address corresponding to the transmission path (e.g., the downlink IP address). However, in the prior art, the relay node cannot know the transmission path selected by the central unit of the donor node, thereby the relay node cannot select a suitable downlink address for receiving downlink data.

In view of the shortcomings of the existing methods, the present application proposes a method and a device for routing a data packet, and a method and a device for controlling data packet transmission in order to solve the foregoing technical defects.

According to a first aspect of the present disclosure, a method for routing a data packet is provided, which is applied to a second node, and the method includes: receiving a first message transmitted by a first node; and determining a transmission path of a data packet according to the first message.

According to a second aspect of the present disclosure, a method for routing a data packet is provided, which is applied to a first node, and the method includes: transmitting a first message to a second node for determining, by the second node, a transmission path of a data packet according to the first message; and receiving a second message transmitted by a second node for confirming that the second node has received the first message.

According to a third aspect of the present disclosure, a method for controlling data packet transmission is provided, which is applied to a fifth node, and the method includes: receiving a third message transmitted by a fourth node, wherein the third message includes assistant information for assisting the fifth node to determine a data packet transmission; and determining a data packet transmission according to a third message.

According to a fourth aspect of the present disclosure, a method for controlling data packet transmission is provided, which is applied to a fourth node, and the method includes: acquiring a third message; and transmitting a third message to a fifth node, wherein the third message includes assistant information for assisting the fifth node to determine a data packet transmission.

According to a fifth aspect of the present disclosure, a method for routing a data packet is provided, which is applied to a sixth node, and the method includes: determining an RLF; and transmitting a fifth message to a seventh node for determining a transmission path of a data packet.

According to a sixth aspect of the present disclosure, a method for routing a data packet is provided, which is applied to a seventh node, and the method includes: receiving a fifth message transmitted by a sixth node; and determining a transmission path of a data packet according to a fifth message.

According to a seventh aspect of the present disclosure, a method for routing a data packet is provided, which is applied to a central unit of a donor node, and the method includes: transmitting a sixth message to a relay node for configuring the user DRB to which the routing data belongs;

and receiving a seventh message transmitted by a relay node for confirming that the sixth message is received, or confirming that the configuration process of the radio bearer is successfully completed.

According to an eighth aspect of the present disclosure, a method for routing a data packet is provided, which is applied to a relay node, and the method includes: receiving a sixth message transmitted by a central unit of a donor node, for configuring the user DRB to which the routing data belongs; and transmitting a seventh message to a central unit of a donor node.

According to a ninth aspect of the present disclosure, a method for configuring a data transmission path is provided, which is applied to a central unit of a donor node, and the method includes: transmitting an eighth message to a relay node for configuring the transmission of user data; receiving a ninth message transmitted by the relay node to confirm that the eighth message is received and further determine address information required to receive the user data.

According to a tenth aspect of the present disclosure, a method for configuring a data transmission path is provided, which is applied to a relay node, and the method includes: receiving an eighth message transmitted by a central unit of a donor node for configuring the transmission of user data; and transmitting a ninth message to the central unit of the donor node.

According to a eleventh aspect of the present disclosure, a second node device is provided, and the second node device includes: a first processing module configured to receive a first message transmitted by a first node; and a second processing module configured to determine a transmission path of a data packet according to the first message.

According to a twelfth aspect of the present disclosure, a first node device is provided, and the first node device includes: a third processing module configured to transmit a first message to a second node, for the second node to determine a transmission path of a data packet according to the first message; and a fourth processing module configured to receive a second message transmitted by a second node, for confirming that the second node has received the first message.

According to an thirteenth aspect of the present disclosure, a fifth node device is provided, and the fifth node device includes: a fifth processing module configured to receive a third message transmitted by a fourth node, wherein the third message includes assistant information for assisting the fifth node to determine a data packet transmission; and a sixth processing module configured to determine a data packet transmission according to the third message.

According to a fourteenth aspect of the present disclosure, a fourth node device is provided, and the fourth node device includes: a seventh processing module configured to acquire a third message; and an eighth processing module configured to transmit a third message to a fifth node, wherein the third message includes assistant information for assisting the fifth node to determine a data packet transmission.

According to a fifteenth aspect of the present disclosure, a sixth node device is provided, and the sixth node device includes: a ninth processing module configured to determine an RLF; and a tenth processing module configured to transmit a fifth message to a seventh node, for determining a transmission path of a data packet.

According to a sixteenth aspect of the present disclosure, a seventh node device is provided, and the seventh node device includes: an eleventh processing module configured to receive a fifth message transmitted by a sixth node; and a twelfth processing module configured to determine a transmission path of a data packet according to the fifth message.

According to a seventeenth aspect of the present disclosure, a central unit device of a donor node is provided, and the central unit device includes: a thirteenth processing module configured to transmit a sixth message or an eighth message to a relay node, for configuring the user DRB to which the routing data belongs or the transmission path of user data; and a fourteenth processing module configured to receive a seventh message or a ninth message transmitted by a relay node, for confirming that the sixth message or the eighth message is received.

According to a eighteenth aspect of the present disclosure, a relay node device is provided, and the relay node device includes: a fifteenth processing module configured to receive a sixth message or an eighth message transmitted by a central unit of a donor node, for configuring a user DRB to which routing data belongs or the transmission path of user data; and a sixteenth processing module configured to transmit a seventh message or a ninth message to a central unit of a donor node.

The technical solutions provided in the embodiments of the present application have at least the following beneficial effects:

1) The relay node can determine the conditions for transmitting user data by using other transmission paths, thereby effectively using multiple transmission paths to implement the user data transmission.

2) The central unit of the donor node can determine the appropriate transmission path according to the received assistant information, and improve the efficiency of user data transmission. Another effect is that the donor node or the central unit of the donor node can effectively perform flow control of data transmission according to the received assistant information. If the data is transmitted through multiple paths, then the donor node or the central unit of the donor node can perform flow control of data transmission effectively on the one or more transmission paths according to the received assistant information (such as selecting an appropriate data transmission rate, selecting an appropriate data transmission volume, etc.)

3) When the RLF occurs in the relay node, other nodes may be notified of the RLF, and the user data is switched to other transmission paths through the notification information, thereby avoiding the interruption of user data transmission due to RLF.

4) After receiving the address information of two or more tunnels transmitted by the central unit of the donor node, the relay node can decide whether it is necessary to establish two or more RLC entities for the user DRB according to the information in the configuration request message of the radio bearer, thereby effectively using resources on the relay node side.

5) When the relay node accesses the central unit of the donor node through two or more different distributed units of donor node(s), the relay node can determine the address information for receiving downlink data according to the configuration information of the received user data.

Additional aspects and advantages of the present application will be given in the following description, which will become apparent from the following description or be learned through the practice of the present application.

BRIEF DESCRIPTION OF DRAWINGS

In order to explain the technical solution in the embodiments of the present application more clearly, the drawings used in the description of the embodiments of the present application will be briefly introduced below.

DETAILED DESCRIPTION

Figure 1:
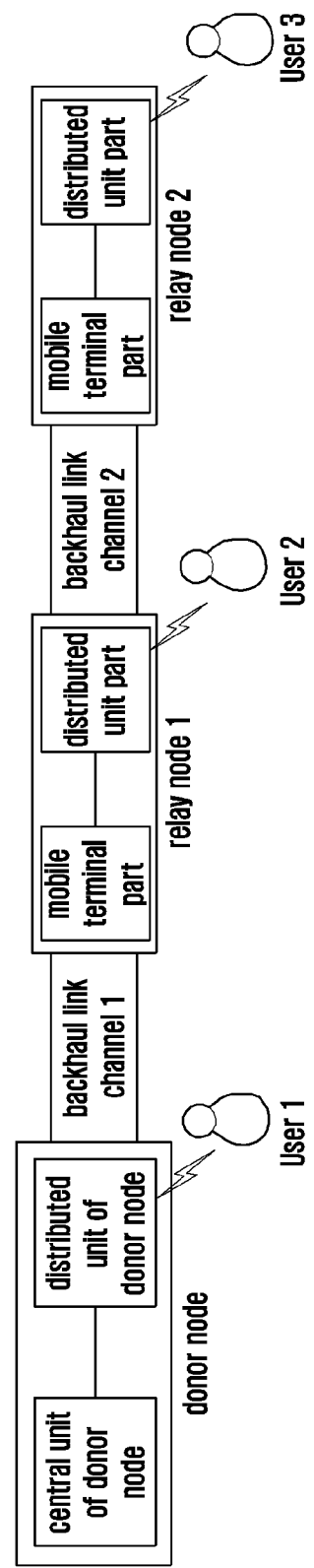
FIG. 1 is a schematic diagram of an existing multi-hop relay network architecture.
Figure 2:
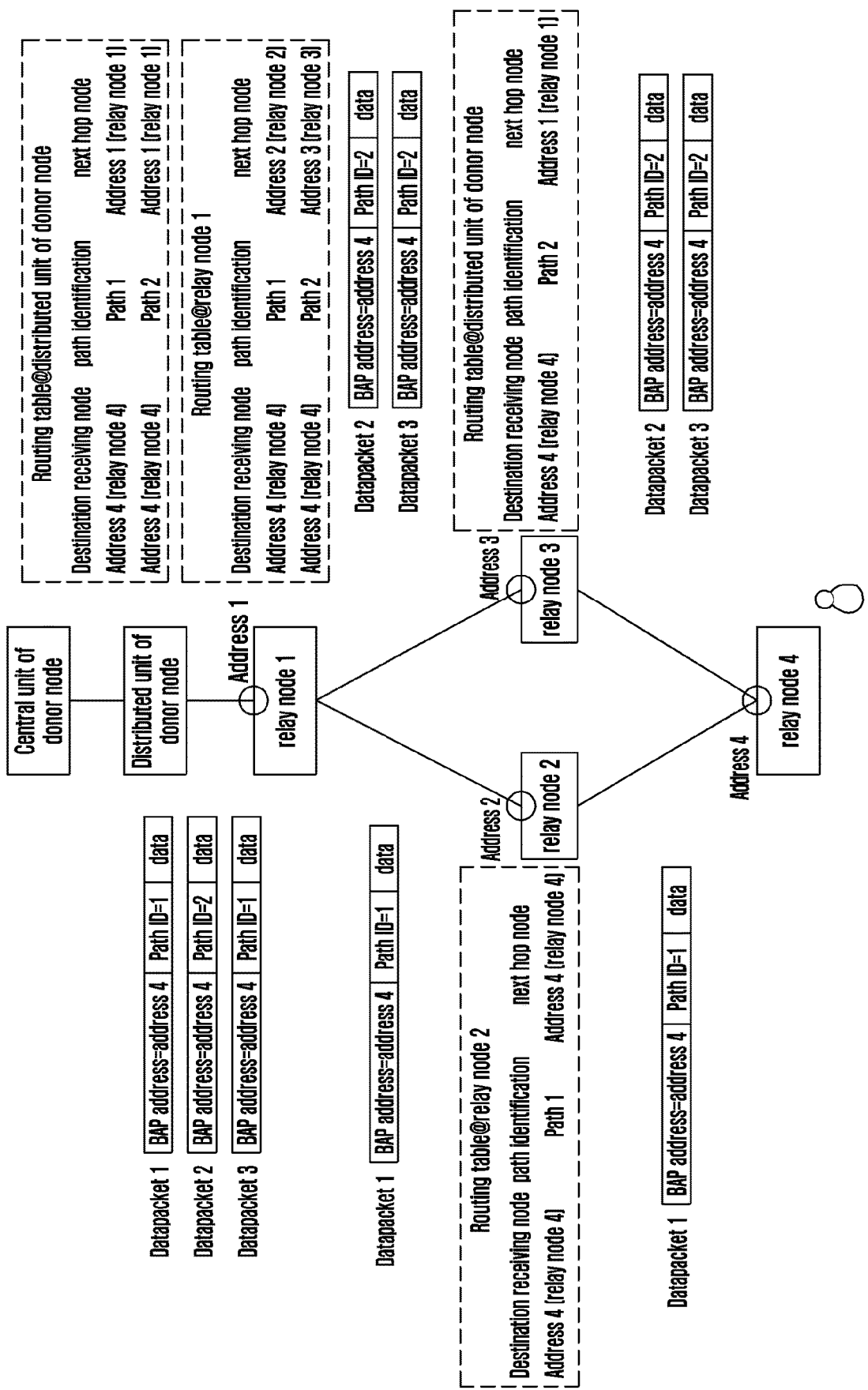
FIG. 2 is a schematic diagram of an existing data packet routing.

The embodiments of the present disclosure are described in detail below, and the examples of the embodiments are illustrated in the drawings, wherein throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

To make the purposes, technical solutions, and advantages of the present application clearer, the embodiments of the present application will be described in further detail below with reference to the accompanying drawings.

In this application, the sequence numbers of the messages are only used to indicate different messages (for example, the first message, the second message, etc. are used to represent different messages), and do not represent the order in which the messages are executed; the sequence numbers of the nodes are used to represent different nodes (for example, the first node and the second node, etc. are used to represent different nodes), and do not represent the order in which the nodes appear in the information interaction process.

In this application, the message names are exemplary, and the use of other names is not excluded.

Embodiment I

Figure 3:
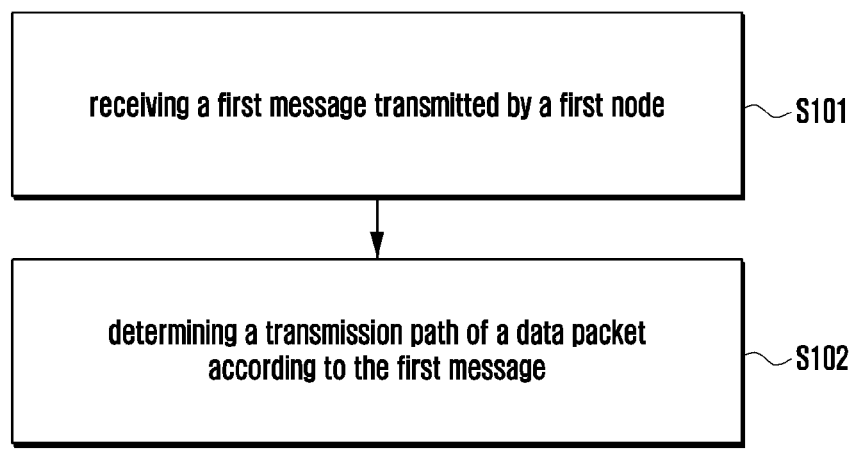
FIG. 3 is a schematic flowchart of a data packet routing method according to an embodiment of the present application.

An embodiment of the present application provides a data packet routing method, which is applied to a second node. A schematic flowchart of the method is shown in FIG. 3, and the method includes:

Step S101: receiving a first message transmitted by a first node.

Step S102: determining a transmission path of a data packet according to the first message.

Optionally, the first node and the second node in the relay network may be donor nodes, or central units of the donor nodes, or distributed units of the donor nodes, or relay nodes. The first message is a transmission path configuration request message.

In the embodiment of the present application, a first message transmitted by a first node is received; and a transmission path of a data packet is determined according to the first message. In this way, the relay node can determine the conditions for transmitting user data using other transmission paths, thereby effectively using multiple transmission paths to complete the user data transmission.

Optionally, the first message includes at least one of the following: first information related to a user data attribute, second information related to a transmission path, indication information indicating whether other transmission paths can be enabled, indication information for activating or deactivating a transmission path, and seventh information related to routing.

Optionally, the first information related to a user data attribute includes at least one of the following: user data attribute indication information, user identification information, data radio bearer (DRB) identification information, signaling radio bearer (SRB) identification information, user radio bearer identification information, control signaling type information, identification information of a backhaul link channel used by the second node to receive user data, identification information of a backhaul link channel used by the second node to transmit user data, identification information and/or address information (for example, BAP address) of a destination receiving node of user data, and routing identification information of user data, identification information of a transmission path of user data, indication information of uplink and downlink data, and indication information of a retransmitted data packet.

Optionally, the second information related to a transmission path includes at least one of the following: identification information of a transmission path, identification information of a primary transmission path, indication information of a primary transmission path, address information (for example, BAP address) or identification information of a destination receiving node of a transmission path, routing identification information of a transmission path, condition information for enabling a transmission path, information of the amount of the data transmitted on a transmission path, quality of service (QoS) information of the data transmitted on the transmission path, and identification information of a backhaul link channel for transmitting user data on a backhaul link between the second node and a next hop node indicated by the transmission path.

Optionally, the seventh information related to routing includes at least one of the following: address information of a second node, address information of a distributed unit of a donor node, IP address information of a distributed unit of a donor node, IP address information of a central unit of a donor node, one or more routing table entries, information of one or more slices supported.

Optionally, the second node adds third information related to a transmission path modification to the data packet during the data packet transmission process, and the third information includes at least one of the following: address information (for example, BAP address) or identification information of the node which modifies transmission path; at least one of transmission path information, routing identification information, and identification information (or address information (for example, BAP address)) of the destination receiving node contained in the data packet before modifying the transmission path; at least one of transmission path information, routing identification information, and identification information (or address information (for example, BAP address)) of the destination receiving node contained in the data packet after modifying the transmission path.

Figure 4:
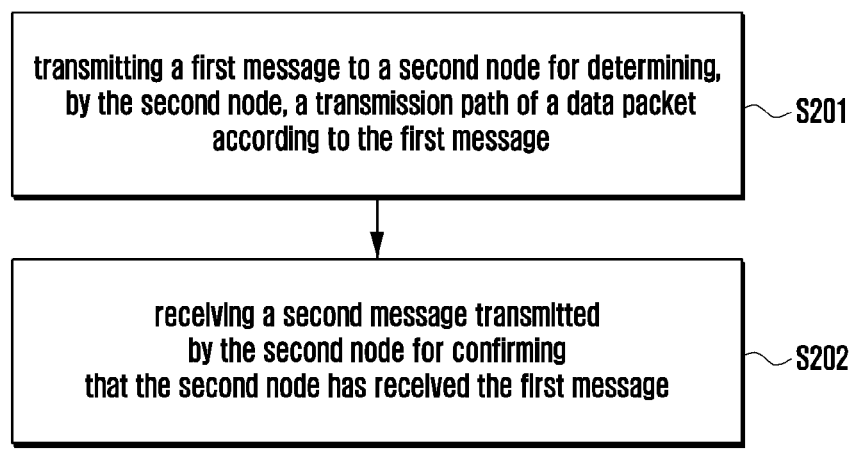
FIG. 4 is a schematic flowchart of another data packet routing method according to an embodiment of the present application.

An embodiment of the present application provides another data packet routing method, which is applied to a first node. A schematic flowchart of the method is shown in FIG. 4. The method includes:

Step S201: transmitting a first message to a second node, for the second node to determine a transmission path of a data packet according to the first message.

Step S202: receiving a second message transmitted by the second node, for confirming that the second node has received the first message or confirming the successful completion of the transmission path configuration process.

Optionally, the second message is a transmission path configuration request response message.

Figure 5:
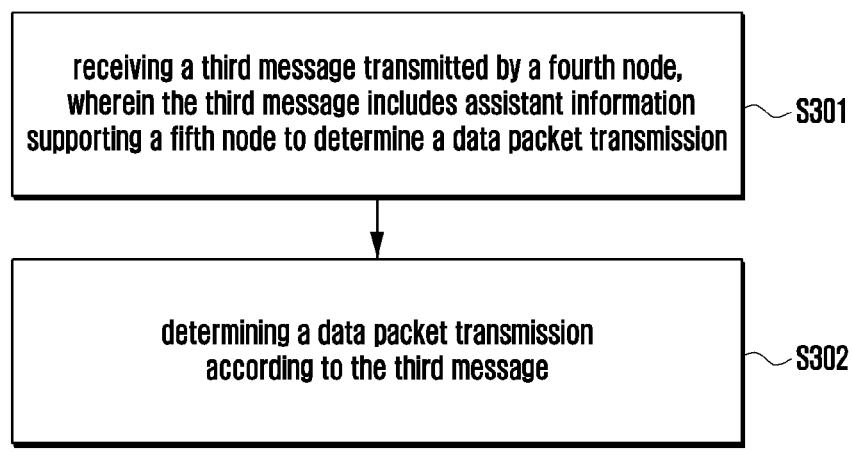
FIG. 5 is a schematic flowchart of a data packet transmission control method according to an embodiment of the present application.

An embodiment of the present application provides a data packet transmission control method, which is applied to a fifth node. A schematic flowchart of the method is shown in FIG. 5. The method includes:

Step S301: receiving a third message transmitted by a fourth node, wherein the third message includes assistant information for assisting the fifth node to determine a data packet transmission.

Step S302: determining the data packet transmission according to the third message.

Optionally, the third message is an assistant information transmission message.

Optionally, the fourth node and the fifth node in the relay network may be donor nodes, or central units of the donor nodes, or distributed units of the donor nodes, or relay nodes.

In the embodiment of the present application, a third message transmitted by the fourth node is received, and the third message includes assistant information that supports the fifth node to determine the data packet transmission; the data packet transmission is determined according to the third message. In this way, the central unit of the donor node can determine an appropriate transmission path according to the received assistant information, and improve the efficiency of the user data transmission.

Optionally, the third message includes at least one of the following: fourth information related to a user data attribute, fifth information related to a data transmission path, identification information or address information (for example, BAP address) when the transmission path of the user data is changed, and information of the transmission path suggested by the fourth node.

Optionally, fifth information related to the data transmission path includes at least one of the following: indication information of the type of the transmission path, identification indication information of the transmission path, and sixth information related to data on the transmission path.

Optionally, the information of the transmission path suggested by the fourth node includes at least one of the following: identification information of one or more transmission paths suggested by the fourth node, and indication information of one or more transmission paths suggested by the fourth node.

Figure 6:
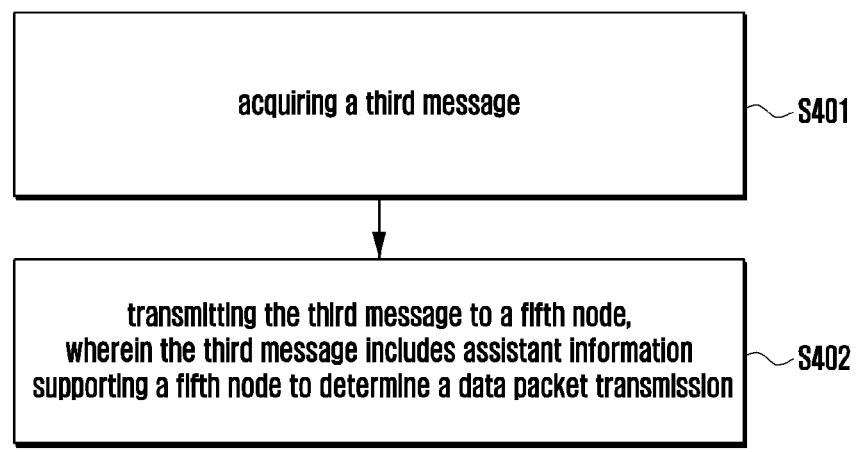
FIG. 6 is a schematic flowchart of another data packet transmission control method according to an embodiment of the present application.

An embodiment of the present application provides another data packet transmission control method, which is applied to a fourth node. A schematic flowchart of the method is shown in FIG. 6. The method includes:

Step S401: acquiring a third message.

Step S402: transmitting a third message to the fifth node, wherein the third message includes assistant information for assisting the fifth node to determine the data packet transmission.

Optionally, the fourth node receives a fourth message transmitted by the fifth node, for indicating the fourth node to provide assistant information to the fifth node.

Optionally, the fourth message is an assistant information request message.

Figure 7:
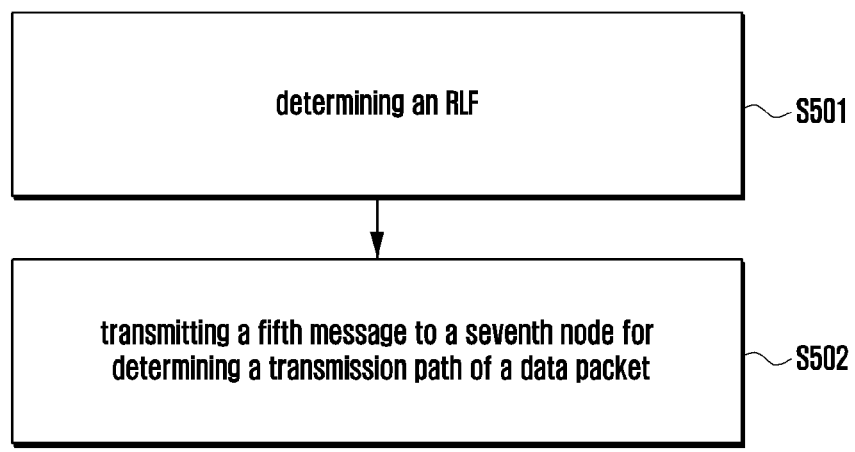
FIG. 7 is a schematic flowchart of another data packet routing method according to an embodiment of the present application.

An embodiment of the present application provides another data packet routing method, which is applied to a sixth node. A schematic flowchart of the method is shown in FIG. 7. The method includes:

In step S501, determining a radio link failure (RLF).

Step S502: transmitting a fifth message to a seventh node, for determining a transmission path of a data packet.

Optionally, the fifth message is a message for reporting RLF.

Optionally, the sixth node, the seventh node, and the ninth node in the relay network may be donor nodes, or central units of the donor nodes, or distributed units of the donor nodes, or relay nodes.

In the embodiment of the present application, by determining the RLF, and transmitting the fifth message to the seventh node for determining the transmission path of the data packet. Other nodes can be notified with link failure when the RLF occurs in the relay node, and the user data is switched to other transmission paths through the notification information, thereby avoiding the interruption of the user data transmission due to the RLF.

Optionally, the fifth message includes at least one of the following: RLF indication information, identification information or address information (for example, BAP address) of the sixth node, indication information of a backhaul link where the RLF occurs, identification information or address information (for example, BAP address) of unreachable nodes, identification information or address information of reachable nodes (for example, BAP address), identification information of a transmission path that cannot be used for data transmission, identification information of a transmission path that can be used for data transmission, identification information of a route that cannot be used for data transmission, identification information of a route that can be used for data transmission, indication information for recovering RLF, and indication information that a back-haul link where RLF occurs has been recovered.

Optionally, the indication information of a backhaul link where the RLF occurs includes at least one of the following: identification information or address information (for example, BAP address) of the node serving the backhaul link, identification information or address information (for example, BAP address) of the distributed unit part of the node serving the backhaul link, and identification information or address information (for example, BAP address) of the mobile terminal part of the node serving the backhaul link.

Optionally, the indication information that a backhaul link where RLF occurs has been recovered includes at least one of the following: identification information or address information (for example, BAP address) of the node serving the backhaul link, identification information or address information (for example, BAP address) of the distributed unit part of the node serving the backhaul link, and identification information or address information (for example, BAP address) of the mobile terminal part of the node serving the backhaul link.

Figure 8:
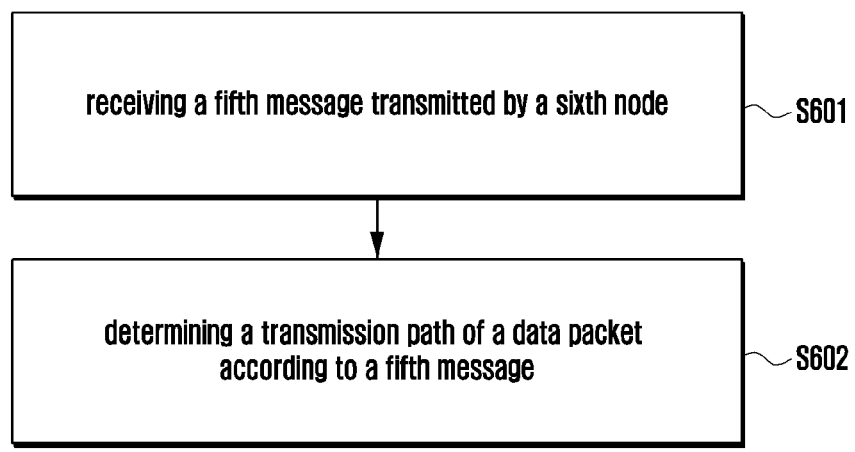
FIG. 8 is a schematic flowchart of another data packet routing method according to an embodiment of the present application.

An embodiment of the present application provides another data packet routing method, which is applied to a seventh node. A schematic flowchart of the method is shown in FIG. 8. The method includes:

Step S601: receiving a fifth message transmitted by a sixth node.

Step S602: determining a transmission path of a data packet according to the fifth message.

Figure 9:
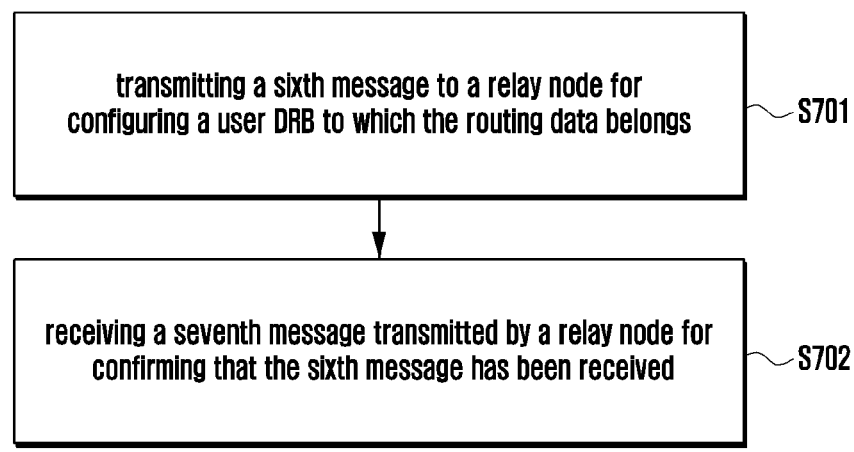
FIG. 9 is a schematic flowchart of another data packet routing method according to an embodiment of the present application.

An embodiment of the present application provides another data packet routing method, which is applied to a central unit of a donor node. A schematic flowchart of the method is shown in FIG. 9. The method includes:

Step S701: transmitting a sixth message to a relay node, for configuring a user DRB to which the routing data belongs.

Step S702: receiving a seventh message transmitted by the relay node to confirm that the sixth message is received, or confirming that the configuration process of the radio bearer is successfully completed.

Optionally, the sixth message is a configuration request message for the radio bearer, and the seventh message is a configuration response message for the radio bearer.

In the embodiment of the present application, a sixth message is transmitted to the relay node for configuring the user DRB to which the routing data belongs; and a seventh message transmitted by the relay node is received. In this way, after receiving the address information of two or more tunnels transmitted by the central unit of the donor node, the relay node can determine whether it is necessary to establish two or more RLC entities for the user DRB according to the information in the configuration request information of the radio bear, thereby effectively using resources on the relay node side.

Optionally, the sixth message includes at least one of the following: identification information of a user's DRB, address information of two or more tunnels on a central unit side of a donor node, and indication information for configuring a radio link control protocol (RLC) entity.

Optionally, the seventh message includes at least one of the following: identification information of a user's DRB, address information of two or more tunnels on a relay node side, and configuration information of a user's DRB.

Figure 10:
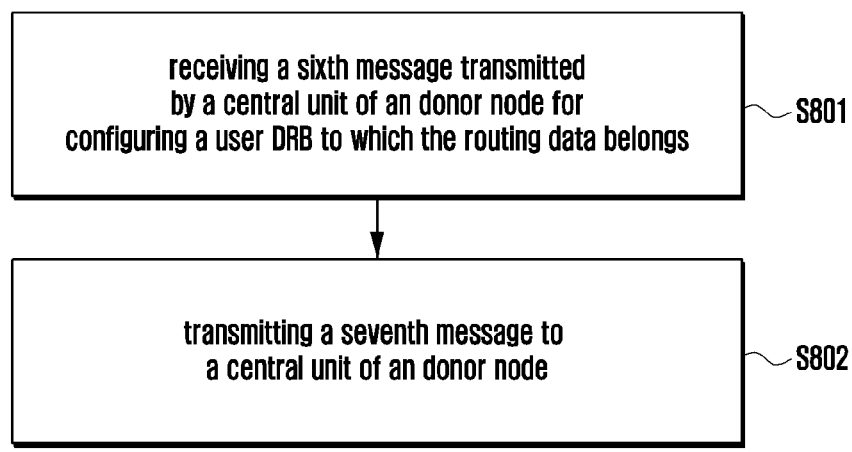
FIG. 10 is a schematic flowchart of another data packet routing method according to an embodiment of the present application.

An embodiment of the present application provides another data packet routing method, which is applied to a relay node. A schematic flowchart of the method is shown in FIG. 10. The method includes:

Step S801: receiving a sixth message transmitted by a central unit of a donor node for configuring a user DRB to which the routing data belongs.

Step S802: transmitting a seventh message to a central unit of a donor node.

Figure 10A:
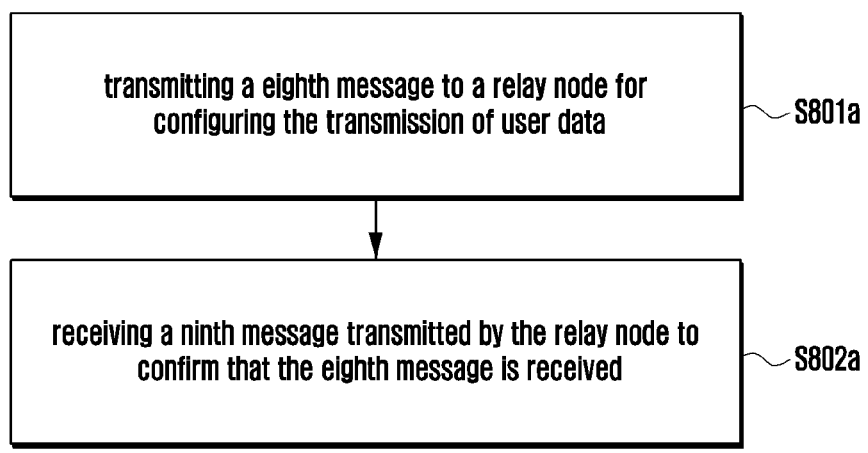
FIG. 10a is a schematic flowchart of a method for configuring a user data transmission path according to an embodiment of the present application.

An embodiment of the present application provides a method for configuring a user data transmission path, which is applied to a central unit of a donor node. A schematic flowchart of the method is shown in FIG. 10a. The method includes:

Step S801a, transmitting an eighth message to a relay node for configuring the transmission of user data.

Step S802a, receiving a ninth message transmitted by the relay node to confirm that the eighth message is received and further determine address information required to receive the user data.

Optionally, the eighth message is a configuration request message of a radio bearer, and the ninth message is a radio bearer setup response message.

In the embodiment of the present application, the eighth message is transmitted to the relay node for configuring the transmission of user data; and the ninth message transmitted by the relay node is received. As such, after the relay node receives the routing configuration information of the central unit of the donor node, it may determine the address information used by the relay node when receiving data.

Optionally, the eighth message includes at least one of the following: information related to the configuration of user data and configuration information related to the transmission path of user data.

Optionally, the ninth message includes information related to the configuration of the user data.

Figure 10B:
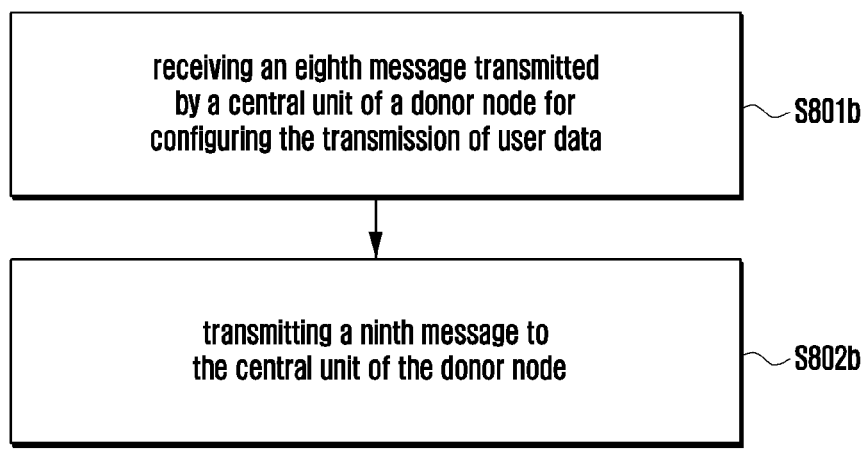
FIG. 10b is a schematic flowchart of another method for configuring a user data transmission path according to an embodiment of the present application.

An embodiment of the present application provides another method for configuring a user data transmission path, which is applied to a relay node. A schematic flowchart of the method is shown in FIG. 10b. The method includes:

Step S801b: receiving an eighth message transmitted by a central unit of a donor node for configuring the transmission of user data.

Step S802b, transmitting a ninth message to the central unit of the donor node.

The following embodiments are used to comprehensively introduce the data packet routing method in the foregoing embodiments of the present application:

In this application, the nodes in the relay network may be donor nodes, or central units of the donor nodes, or distributed units of the donor nodes, or the relay nodes.

It should be noted that node 1 is the first node, node 2 is the second node, node 3 is the third node, node 4 is the fourth node, node 5 is the fifth node, node 6 is the sixth node, and node 7 is the seventh node, node 8 is the eighth node, and node 9 is the ninth node.

Optionally, the transmission path indicates a node through which user data is transmitted. In one embodiment, the transmission path may be an end-to-end path from a source transmitting node to a destination receiving node of a data packet, that is, the transmission path represents a source node (the source node can be the donor node, or the central unit of the donor node, or the distributed unit of the donor node, or node 2), one or more intermediate nodes (or there may be no intermediate nodes) and the destination receiving node through which the data packet is transmitted in sequence; in another embodiment, for a data packet, the transmission path may be the next hop node that receives the data packet. If the transmission path is different, the next hop node is different.

Optionally, the user data may be data of the user plane, for example, data carried by the DRB or data of the user plane of the F1 interface, or may be data of the control plane, for example, data carried by the SRB or data of the control plane of the F1 interface; the targeted user may be a terminal user (the user is not a relay node), or may be a relay node, or may be a mobile terminal part of a relay node.

Figure 11:
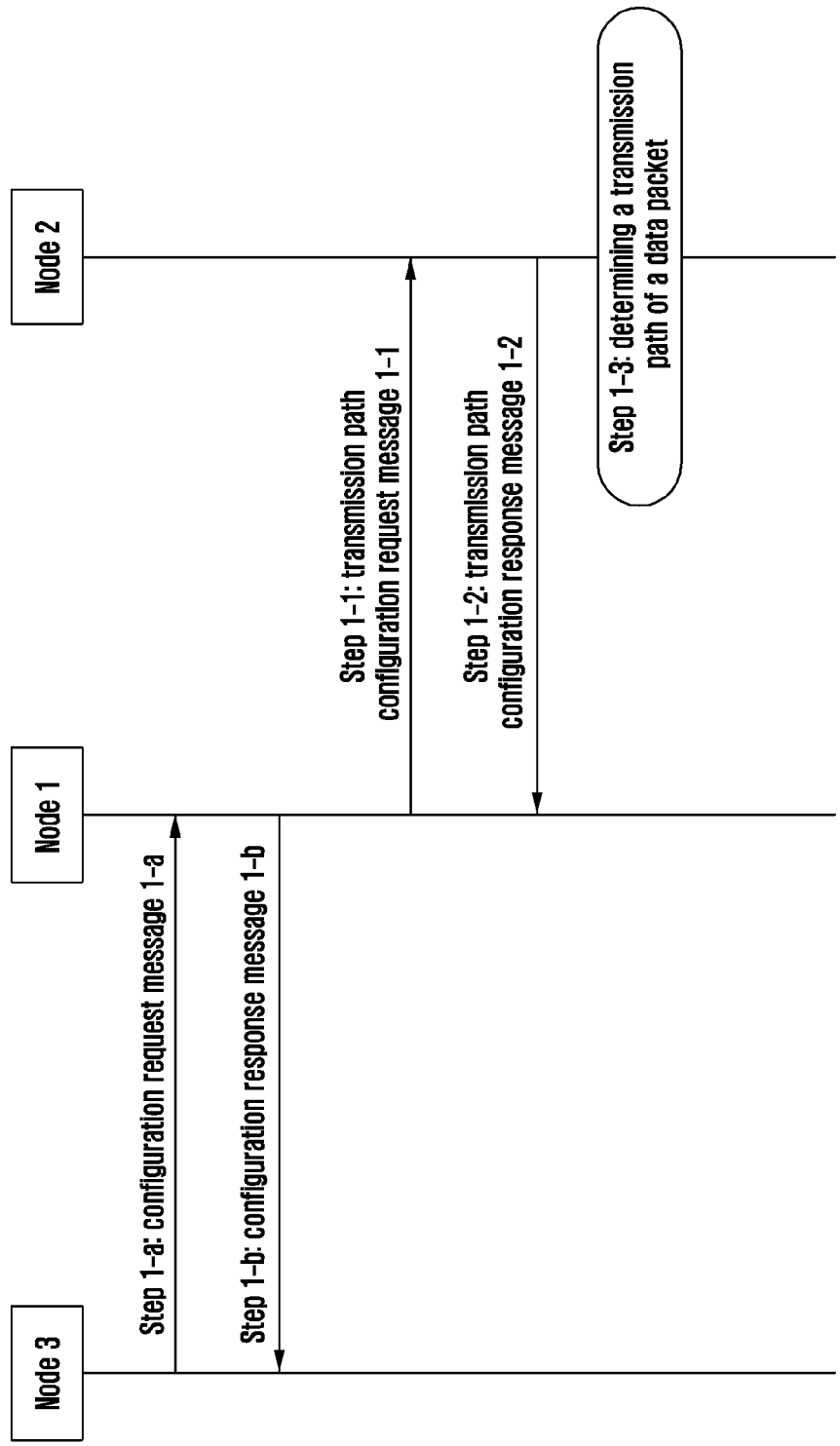
FIG. 11 is a schematic flowchart of a transmission path setup according to an embodiment of the present application.

The first aspect of the present application: as shown in FIG. 11, a data packets routing method is provided in an embodiment of the present application. The method includes the following steps:

Step 1-1: Node 1 transmits a transmission path configuration request message 1-1 to node 2. The configuration request message can help node 2 determine whether to enable a transmission path to transmit user data. The configuration request message includes at least one of the following information:

first information related to a user data attribute. The information includes at least one of the following information:

User data attribute indication information. The indication information can be used to indicate user data attribute information. The attribute information is one or more of other information contained in the "first information related to a user data attribute", the different indication information indicates that the targeted users have different attributes;

User identification information; the user indicated by the identification information is the user to which the user data belongs;

DRB identification information; the DRB indicated by the identification information is the DRB to which the user data belongs;

SRB identification information; the SRB indicated by the identification information is the SRB to which the user data belongs;

Identification information of a user radio bearer. The information can be used to indicate the user to which the user data belongs and the radio bearer.

Type information of control signaling, for example, non-user-associated control signaling of the F1 interface, user-associated control signaling of the F1 interface, etc.;

Identification information of the backhaul link channel (i.e., ingress backhaul RLC channel) used by node 2 to receive user data;

Identification information of the backhaul link channel (i.e., egress backhaul RLC channel) used by node 2 to transmit user data;

Identification information and/or address information (for example, BAP address) of the destination receiving node of the user data;

Routing identification information of user data;

Identification information of a transmission path of user data;

Indication information of uplink and downlink data, indicating that user data is uplink data, or downlink data, or uplink data and downlink data;

Indication information of a retransmitted data packet, indicating whether the data packet is a retransmitted data packet.

Second information related to a transmission path. The transmission path refers to one or more transmission paths of different transmission paths to the same destination receiving node. In one embodiment, the user data corresponding to the "second information related to a transmission path" has the same attribute (the attribute is one or more attributes contained in the "first information related to a user data attribute"). For a transmission path, the information includes at least one of the following information:

Identification information of a transmission path;

Identification information of a primary transmission path (Primary Path ID). The primary transmission path is the main transmission path required for transmitting user data. Node 2 can use other transmission paths to transmit user data only when a certain condition is met (for example, see the following "condition information for enabling the transmission path");

Indication information of a primary transmission path. The primary transmission path is the main transmission path required for transmitting user data. Node 2 can use other paths to transmit user data only when a certain condition is met (for example, see the following "condition information for enabling the transmission path");

Address information (for example, BAP address) or identification information of the destination receiving node of the transmission path;

Routing identification information of a transmission path, which indicates the destination receiving node and a transmission path to the destination receiving node;

Priority information for enabling the transmission path, which indicates the priority for enabling the transmission path when other transmission paths need to be enabled to transmit user data;

Condition information for enabling the transmission path. In one embodiment, the condition information may be set for data with the same attribute (the attribute is one or more attributes contained in the "first information related to a user data attribute"). In one embodiment, if the data packet received by node 2 contains transmission path information (for example, Path ID), then the enabled transmission path is different from the transmission path indicated in the data packet, and it can transmit the data packet received by node 2 to one or more other transmission paths of the destination receiving node. In another embodiment, if the data packet received by node 2 does not contain transmission path information, the enabled transmission path is capable of transmitting the data packet received by node 2 to one or more transmission paths of the destination receiving node. For one transmission path, the condition information includes at least one of the following information:

- indication information of whether the transmission path can be enabled, the indication information can indicate that the transmission path cannot be enabled, or it can indicate that the transmission path can be enabled;
- Threshold information of the data packet stored in the cache of node 2. If the amount of stored data packets exceeds the amount indicated by the threshold information, the transmission path is enabled. The threshold information can be in bits or can be in bytes, or can be in numbers, or can be in other quantities. The threshold information may be a threshold set for an average data packet stored in the cache, or a threshold set for a data packet stored at any time in the cache; the stored data packets are all the data packets received from one or more other nodes by node 2, or may be part of data packets received from one or more other nodes by node 2 (in one implementation, part of the data packets may be data packets whose time that stored in one or more other nodes exceeds a certain threshold. If the time that some data packets in the data packets received by node 2 was stored in one or more other nodes does not exceed the threshold, then these data packets are not counted);
- Threshold information of the time that the data packet was stored in the cache of node 2. If the time that the data packet was stored in the cache exceeds the value indicated by the threshold information, the transmission path is enabled;
- Threshold information of the time that the data packets are transmitted from other nodes in the relay node to node 2. If the time that the data packets are transmitted from other nodes in the relay node to node 2 exceeds the value indicated by the threshold information, then the transmission path is enabled.
- Indication information indicating to enable the transmission path when the RLF occurs at the link from node 2 to the next hop node, then next hop node is a next hop node indicated by the routing information contained in the data packet received by node 2;
- Threshold information of the link quality (for example, signal strength, signal-to-interference and noise ratio, RSRP, RSRQ, CQI, etc.) of the link from node 2 to its next hop node or previous hop node, for example, if the quality of the link is less than the threshold, the transmission path is enabled. The next hop node is a next hop node indicated by the routing information contained in the data packet received by node 2; the previous hop node is a node that transmits a data packet to node 2;
- Threshold information of the available buffer size reported by the next hop node of node 2. If the available buffer size is less than the threshold information, the transmission path is enabled. The buffer size can correspond to the data with the same attributes (the attribute is the one or more attributes contained in the "first information related to a user data attribute"). The next hop node is a next hop node indicated by the routing information contained in the data packet received by node 2;
- An RLF occurs in one or more nodes in the transmission path indicated by the routing information contained in the data packet received by node 2.

Amount information of data transmitted on the transmission path. The information indicates the amount of data transmitted after the transmission path is enabled. In one embodiment, the amount information indicates information about the number of data packets transmitted on the transmission path. In another embodiment, the amount information indicates the information of bits or bytes of data packets transmitted on the transmission path. In another embodiment, the amount information indicates the percentage ratio of the packets transmitted on the transmission path to the packets needing to be transmitted and with the same attribute (the attribute is one or more attributes contained in the "first information related to a user data attribute").

QoS information of data transmitted on the transmission path, the information indicates QoS information of data transmitted after the transmission path is enabled;

Identification information of the backhaul link channel used to transmit user data on the backhaul link between node 2 and the next hop node indicated by the transmission path. The number of the backhaul link channels may be one or more. If there are multiple backhaul link channels, the identification information of multiple backhaul link channels will be included. Further, it may also include the QoS information of a backhaul link channel;

Indication information indicating whether other transmission paths can be enabled, or indication information indicating whether to modify the path identification information in the data packet. The indication information is set for data with the same attributes (the attributes is one or more attributes contained in the above "first information related to a user data attribute");

Indication information for activating or deactivating a transmission path. The indication information can be used to indicate the transmission path for transmitting user data, or indicate the transmission path not for transmitting user data. The indication information can correspond to all the data with the same destination receiving node transmitted by node 2, or may correspond to a part of data transmitted by node 2 to the same destination receiving node (for example, the part of data is data with the same attribute, and the attribute is the one or more attributes contained in the "first information related to a user data attribute" in the above step 1-1), in one embodiment, the indication information may be one bit map, in which each bit represents one transmission path, the value of the bit is used to indicating to active or deactivate the transmission path (for example, "1" represents "activate", and "0" represents "deactivate", or "0" represents "activate", and "1," represents "deactivate");

Seventh information related to routing. The seventh information related to routing includes at least one of the following information:

Address information of node 2, the address information is address information used when node 2 is the destination receiving node, for example, BAP address. For example, when the identification information or address information of the destination receiving node contained in the user data packet is the address information, it represents that the destination receiving node of the data packet is node 2.

Address information of the distributed unit of the donor node. The address information is address information (for example, BAP address) used when the distributed unit of the donor node is used as the destination receiving node. In one embodiment, the distributed unit of the donor node is directly connected to node 2 or indirectly connected to node 2 through other relay nodes. For example, when node 2 transmits user data (the user data is data of the terminal user (non-relay node) of access node 2) or data generated by node 2 itself (the data is data of the F1 control plane or data of the F1 user plane generated by node 2), if the data needs to be transmitted to the distributed unit of the donor node, node 2 sets the identification information or address information of the destination receiving node in the data packet as the information;

IP address information of the distributed unit of the donor node. In one embodiment, the IP address information corresponds to the "address information of a distributed unit of a donor node". For example, when the destination IP address of a data packet to be transmitted by the node 2 is this IP address, the node 2 may add "address information of a distributed unit of a donor node" to the data packet;

IP address information of a central unit of a donor node. In one embodiment, the IP address information corresponds to the "address information of a central unit of a donor node". For example, when the destination IP address of a data packet to be transmitted by node 2 is the IP address, node 2 may add "address information of a central unit of a donor node" to the data packet;

One or more routing table entries. Each routing table entry includes at least one of the following information:

Routing identification information. In one embodiment, the routing identification information may be composed of identification information or address information (for example, BAP address) of a destination receiving node and identification information of a transmission path. In another embodiment, the routing identification information may be used to indicate a destination receiving node and a transmission path identification;

Identification information or address information (for example, BAP address) of a destination receiving node:

Identification information of a transmission path;

identification information or address information (for example, BAP address) of a next hop node;

Information of one or more slices supported, for example, one or more S-NSSAI (Single Network Slice Selection Assistance Information) information. After receiving the information, node 2 can use the routing table entry to determine the data transmission path only after receiving the user data served by the slice.

Information of one or more slices supported, for example, one or more S-NSSAI (Single Network Slice Selection Assistance Information) information. The information indicates that the data transmission path can be determined according to the routing table only for the user data served by the slice.

Step 1-2: Node 2 transmits a transmission path configuration request response message 1-2 to node 1. This message is used to confirm that node 2 has received a transmission path configuration request message 1-1, or used to confirm that the transmission path configuration process has been successfully completed, or used to confirm that the signaling interaction process involved in the transmission path configuration request message 1-1 and the transmission path configuration request response message 1-2 is successfully completed. This step can be an optional step.

Step 1-3: After node 2 receives the data packet, if the conditions configured in step 1-1 are met, node 2 will determine the transmission path of the data packet according to the configuration in step 1-1. Optionally, node 2 modifies the transmission path information contained in the data packet (modify the transmission path information in the data packet to the selected transmission path), and transmits the data packet to the corresponding next hop node according to the selected transmission path. Further, if node 2 changes the transmission path of the data packet, node 2 may add the third information related to a transmission path modification to the data packet, and the information includes at least one of the following information:

Address information (for example, BAP address) or identification information of the nodes which modify the transmission path;

The transmission path information and/or routing identification information contained in the data packet, and/or the identification information or address information (for example, BAP address) of the destination receiving node, before modifying the transmission path;

The transmission path information and/or routing identification information contained in the data packet, and/or identification information or address information (for example, BAP address) of the destination receiving node, after modifying the transmission path.

Optionally, the above method is applicable to transmission of the downlink data (data transmitted to the relay node by a donor node or a central unit of the donor node or a distributed unit of the donor node) and/or uplink data (data transmitted by the relay node to the donor node or the distributed unit of the donor node or the central unit of the donor node).

Optionally, the configuration request message 1-1 in the above steps may be an F1 control message (for example, an GNB-CU Configuration Update message, a UE Context Setup/Modification Request message, or a newly defined message) or a control message of an X2 interface (SgNB Addition/Modification Request), or may be a control message of an Xn interface (S-Node Addition/Modification Request), or may be an RRC message (for example, RRCResetup message, or newly defined message), or may be the information placed in a packet header of the MAC layer, or may be the information placed in the packet header of the BAP layer, or may be the information placed in the packer header of the RLC layer, or may be transmitted in any other form. The transmission path configuration request response message 1-2 can be an F1 control message (for example, an GNB-CU Configuration Update Acknowledge message, a UE Context Setup/Modification Response message, or a newly defined message), or may be a control message of an X2 interface (SgNB Addition/Modification Request Acknowledge), or may be a control message of an Xn interface (S-Node Addition/Modification Request Acknowledge), or may also be an RRC message (for example, RRCReconfigurationComplete messages, or a newly defined message), or may be the information placed in the packet header of the MAC layer, or may be the information placed in the packet header of the BAP layer, or may be the information placed in the packet header of the RLC layer, or may be transmitted in any other form.

Optionally, if node 1 is a donor node or a central unit of a donor node, node 2 is a distributed unit of a donor node or a relay node; if node 1 and node 2 belong to two different base stations, node 1 is base station 1 or the central unit of base station 1, and node 2 is base station 2 or the central unit of base station 2. Further, base station 1 and base station 2 may be the master base station and secondary base station (or the secondary station and the master base station) in a dual connection, respectively; if node 1 is the distributed unit of the donor node or the relay node, then node 2 is the relay node (one implementation is that node 2 is a relay node directly connected to node 1; the other implementation is that node 2 is connected to node 1 through one or more intermediate nodes).

Optionally, when node 1 is the distributed unit of the donor node or the relay node, and node 2 is the relay node, as shown in FIG. 11, the method further includes the following steps:

Step 1-a: Node 3 transmits a configuration request message 1-a to node 1. Node 3 can be a donor node or a central unit of the donor node. The message is used to transmit the information related to a transmission path of the data packet on node 2. For node 2, the message includes at least one of the following information:

Address information (for example, BAP address) or identification information of a destination receiving node. The destination receiving node is a destination receiving node that can reach through node 2. In other words, the routing table on node 2 contains the routing table entry to the destination receiving node.

Identification information of one or more or all transmission paths to the destination receiving node mentioned above;

Indication information indicating whether other transmission paths can be enabled, or indication information indicating whether to modify the path identification information in the data packet;

For information related to a transmission path, refer to the definition in step 1-1.

Step 1-b: Node 1 transmits a configuration request response message 1-b to node 3, which is used to confirm that node 1 has received the configuration request message 1-a, or used to confirm that the signaling interaction process involved in the configuration request message 1-a and the configuration request response message 1-b is successfully completed. This step can be an optional step.

An effect of the first aspect of the present application is that the relay node can determine a transmission path of the user data, thereby effectively using multiple transmission paths to complete the user data transmission.

The first aspect of the present application has the following possible implementations:

The first aspect (Implementation 1): Node 1 transmits condition information for enabling other transmission paths to node 2. This method includes the following steps:

Step 1-1: Node 1 transmits a transmission path configuration request message 1-1 to node 2. The message includes at least one of the following information:

First information related to a user data attribute;

Second information related to a transmission path;

Indication information indicating whether other transmission paths can be enabled.

Step 1-2: Optionally, node 2 transmits a transmission path configuration request response message 1-2 to node 1 to confirm the information transmitted in step 1-1 is received.

Step 1-3: After node 2 receives the data packet, if the conditions configured in step 1-1 are met, node 2 determines the transmission path of the data packet according to the configuration in step 1-1. Optionally, as described above, node 2 may add information related to the transmission path modification to the data packet.

This implementation can help node 2 determine a condition for selecting a user data transmission path, and transmit the user data according to the determined transmission path.

The first aspect (implementation 2): node 1 transmits information related to a routing table to node 2, the method includes the following steps:

Step 1-1: Node 1 transmits a transmission path configuration request message 1-1 to node 2. The message includes at least seventh information related to routing. The seventh information related to routing is used by node 2 for data packet routing.

Step 1-2: Optionally, node 2 transmits a transmission path configuration request response message 1-2 to node 1 to confirm the information transmitted in step 1-1.

Step 1-3: After node 2 receives the data packet, node 2 performs the user data routing according to the routing table. Optionally, as described above, node 2 may add information related to a transmission path modification to the data packet.

An effect of this embodiment is that the node 2 determines a data transmission path according to the received seventh information related to routing.

First aspect (Implementation 3): Node 1 transmits information related to activation or deactivation of the transmission path to node 2. This method includes the following steps:

Step 1-1: Node 1 transmits a transmission path configuration request message 1-1 to node 2. The message includes at least one of the following information:
  First information related to a user data attribute;
  Indication information for activating or deactivating a transmission path.

Step 1-2: Optionally, node 2 transmits a transmission path configuration request response message 1-2 to node 1 to confirm the information transmitted in step 1-1 is received.

Step 1-3: after node 2 receives the data packet, node 2 transmits the data packet according to the activated or deactivated transmission path. Optionally, as described above, node 2 may add information related to a transmission path modification to the data packet.

When node 1 is a distributed unit of the donor node or a relay node, and node 2 is a relay node, before step 1-1, step 1-a may be further included, and optionally, step 1-b is included. For step 1-a/1-b, refer to steps 1-a and 1-b described above.

The effect of this embodiment is that node 2 can determine an available transmission path according to the information for activating or deactivating, and thus transmit data on the activated transmission path.

First aspect (Implementation 4): Node 1 transmits information of the amount of data transmitted on the transmission path to node 2. Node 1 is a secondary base station, node 2 is a master base station, and node 1 and node 2 form two base stations in a dual-connection. This method includes the following steps:

Step 1-1: Node 1 transmits a transmission path configuration request message 1-1 to node 2. The message includes at least one of the following information:
  First information related to a user data attribute;
  Identification information of a transmission path;
  Information of the amount of the data transmitted on the transmission path, the transmission path is the path indicated by the identification information of the transmission path.

Optionally, before step 1-1, the method further includes: transmitting a request message for configuring user radio bearer between the base stations to node 1, the message includes at least "first information related to a user data attribute", and the above transmission path configuration request message 1-1 is a response to the "a request message for configuring user radio bearer between the base stations". For example, the request message for configuring user radio bearer between base stations is a control message of an X2 interface (for example, SgNB Addition/Modification Request or S-Node Addition/Modification Request), or may be a control message of an Xn interface (for example, S-Node Addition/Modification Request), and the transmission path configuration request message 1-1 is a control message of an X2 interface (for example, SgNB Addition/Modification Request Acknowledge), or may be a control message of an Xn interface (for example, S-Node Addition/Modification Request Acknowledge).

The effect of this implementation is that the master base station can determine a transmission of user data on one or more transmission paths according to the information transmitted by the secondary base station.

Figure 12:
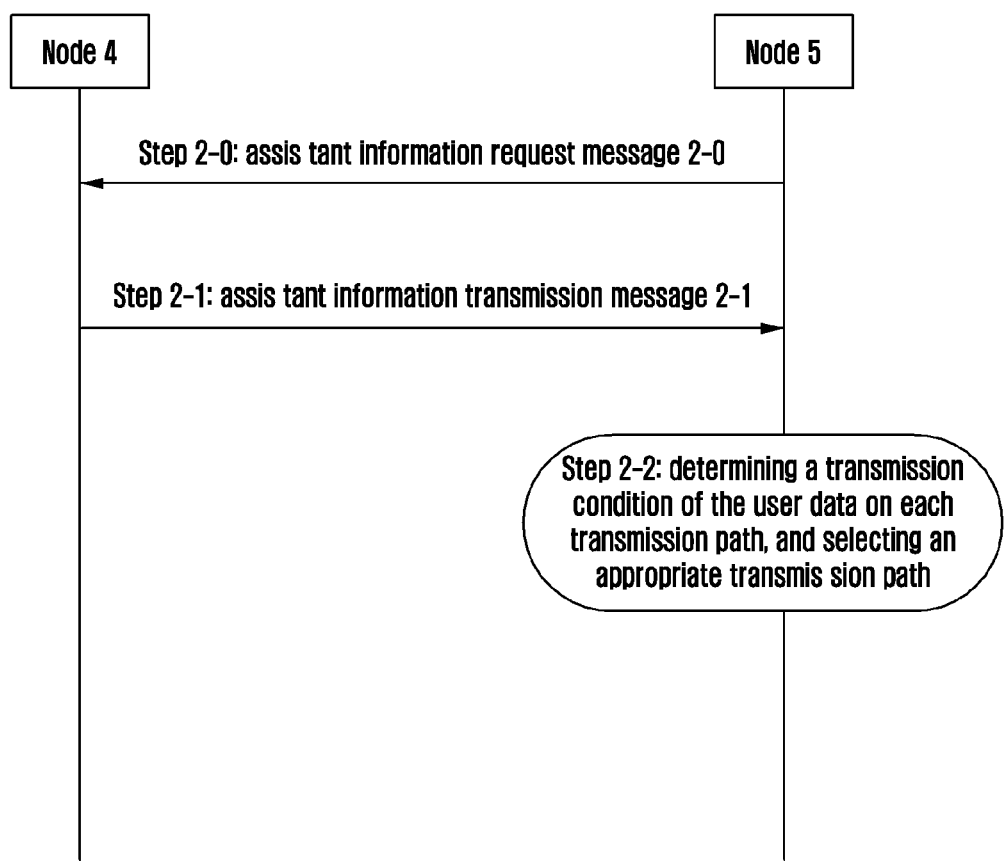
FIG. 12 is a schematic flowchart of a method for providing assistant information for selecting a transmission path according to an embodiment of the present application.

The second aspect of the present application: a data packet routing method is provided in an embodiment of the present application. This aspect includes: a distributed unit of a donor node or a relay node provides assistant information to the donor node or a central unit of the donor node for assisting the donor node or the central unit of the donor node to determine the transmission path of the user data. As shown in FIG. 12, the method includes the following steps:

Step 2-1: Node 4 transmits an assistant information transmission message 2-1 to node 5, the message contains assistant information for assisting node 5 to select a user data transmission path, and the message includes at least one of the following information:
  Fourth information related to a user data attribute, refer to the definition in step 1-1 of the first aspect of the present application. The information may be given in an explicit manner or in an implicit manner. One implementation is that if the assistant information transmission message 2-1 is transmitted through a user plane message of an F1 interface (for example, DL DATA DELIVERY STATUS or ASSISTANCE INFORMATION DATA message), the tunnel information used to transmit the message can be used to obtain DRB to which the user data belongs.
  Fifth information related to a data transmission path. The data targeted by the information may include: 1) the data that the destination receiving node is node 4; 2) the destination receiving node is not node 4 and node 4 has not modified the data transmission path; 3) the destination receiving node is not node 4, and node 4 has modified the data transmission path; 4) the destination receiving node is not node 4. The transmission path targeted by the "fifth information related to a data transmission path" may be the transmission path (ingress path) indicated by the data packet received by node 4, or may be the transmission path (egress path) indicated in the data packet when node 4 transmits the data packet to other nodes, the ingress path and the egress path may be the same or may be different. For a transmission path, the information includes at least one of the following information:
  Indication information of type of the transmission path, which indicates whether the transmission path is the transmission path (ingress path) indicated by the data packet received by node 4 or the transmission path (egress path) indicated in the data packet when node 4 transmits the data packet to other nodes. The indication information may be explicit indication information or implicit indication information;
  Identification indication information of a transmission path. The indication information includes at least one of the following information:
    Identification information of a transmission path;
    Indication information of a transmission path. The indication information is used to indicate the transmission path used for transmitting user data. According to the indication information, node 5 can learn the identification of the transmission path targeted by the "fifth information related to a data transmission path;
    Routing identification information of a transmission path, the routing identification information indicates a destination receiving node and a transmission path to the destination receiving node;
    Address information (for example, BAP address) or identification information of the destination receiving node of the transmission path.

Further, the transmission path indicated by the indication information may be a transmission path that satisfies certain conditions, for example, the data amount of data transmitted through the transmission path exceeds a certain threshold, the percentage of data transmitted through the transmission path to all the data exceeds a certain threshold, etc. For sixth information related to data on the transmission path, the data is the user data with the same attribute (the attribute is the one or more attributes contained in "fourth information related to a user data attribute") transmitted by node 4 or received by node 4 on the transmission path, the user data packet may be all the data packets with the same attribute received from one or more other nodes by node 4, or may be a part of data packets with the same attribute received from one or more other nodes by node 4 (in one implementation, a part of data packets may the data packet, whose time that the data packet stored in one or more other nodes exceeds a certain threshold. If the time that some data packets in the data packets received by node 4 stored in one or more other nodes does not exceed the threshold, then these data packets are not counted). The information includes at least one of the following:

Data volume information of user data. The information can be in bits, bytes, or the number of packets. It can also be the percentage of the data volume on the transmission path to the total data amount (the total data volume is the total volume of the user data with the same attributes processed or received or transmitted by node 4), and can also be represented in other forms. Further, the data volume information can be data volume information of uplink data, and/or data volume information of downlink data, and/or data volume information of uplink and downlink data;

Data rate information, the information may be an average rate information. Further, the rate information may be rate information of uplink data, and/or rate information of downlink data, and/or rate information of uplink and downlink data.

Information of interval time of user data. This interval time is the interval time between receiving or transmitting two data packets. The interval time information can be the average interval time information. Further, the information of interval time can be the information of the interval time of uplink data, and/or information of the interval time of downlink data, and/or information of the interval time of uplink and downlink data;

Buffer size expected by node 4, and/or available buffer size;

Data transmission rate expected by node 4, and/or the acceptable data transmission rate.

The above "sixth information related to data on a transmission path" reflects the state of data transmission/reception on the transmission path, and thus may also be referred to as "data transmission state information" or "data reception state information".

There are multiple methods for expressing the above "fifth information related to a data transmission path". One implementation is to provide, for each transmission path, "indication information of type of transmission path" and/or "identification indication information of a transmission path" and/or "sixth information related to data on the transmission path", another embodiment is to indicate a transmission path in the form of a bitmap, each bit represents a transmission path, and the value of each bit represents whether node 4 provides information related to the transmission path represented by the bit. For example, "1" means the information is included, "0" means the information is not included, or "0" means the information is included, "1" means the information is not included. If a bit representing a certain transmission path indicates information related to the transmission path is contained, it may also include "indication information of type of a transmission path" and/or "information related to data a transmission path". If the above "fifth information related to a data transmission path" only contains "identification indication information of a transmission path", it means that the data received by node 4 is from the transmission path indicated by the "identification indication information of a transmission path". Further, if there is only one transmission path from node 4 to node 5, the above "fifth information related a data transmission path" can also not contain information indicating a transmission path, for example, only contains "six information related to data on a transmission path".

Identification information or address information (for example, BAP address) of the node when the transmission path of the user data is changed. Furthermore, when the transmission path is changed, it may also include identification information of the transmission path before the change, and identification information of the transmission path after the change;

Information of a transmission path suggested by node 4, the suggested transmission path is one or more transmission paths suggested by node 4 for transmitting user data, and the information includes at least one of the following information:

Identification information of one or more suggested transmission paths;

Indication information of one or more suggested transmission paths. The indication information can be given in the form of a bitmap. Each bit of the bitmap represents a transmission path, and the value of each bit represents whether node 4 suggests node 3 using the transmission path. For example, "1" indicates that it is recommended to use, "0" indicates that it is not recommended to use, or "0" indicates that it is recommended to use, and "1" indicates that it is not recommended to use.

Step 2-2: According to the information contained in step 2-1, node 5 can learn the transmission condition of user data on each transmission path, for example, the load and rate, etc. It can also help node 5 select an appropriate transmission path for user data, or can help node 5 add a new transmission path, or can help node 5 perform flow control when transmitting data.

Optionally, before step 2-1, it may further include that node 4 acquires the information in the assistant information transmission message. Specifically, node 4 receives the user data from other nodes, and acquires the information contained in the assistant information transmission message 2-1 according to the received user data, and then generates the assistant information transmission message.

Optionally, before step 2-1, step 2-0 may also be included.

Step 2-0: node 5 transmits an assistant information request message 2-0 to node 4, the message is used to indicate node 4 to provide the assistant information to node 5, the message includes at least one of the following information:

Information related to a user data attribute, refer to the definition in step 1-1 of the first aspect of the present application. The information helps node 4 determine which data needs to provide assistant information to node 5;

Identification information of a transmission path used to transmit the assistant information transmission message 2-1, and/or identification information of a backhaul link channel used;

Configuration information that Node 4 needs to provide "fifth information related to a data transmission path" to node 5. In one embodiment, the configuration information may correspond to the user data with the same attribute (the attribute is the one or more attributes contained in "fourth information related to a user data attribute"). The configuration information includes at least one of the following information:

Indication information indicating whether node 4 provides "fifth information related to a data transmission path" to node 5, the indication information may be "providing" or "not providing"; in one implementation, the indication information indicates that node 5 transmits polling indication information to node 4. The indication information may be used to indicate "providing" or "not providing". If indicating "providing", then node 4 provides "fifth information related to a data transmission path" to node 5.

Identification information of a transmission path (route), node 4 needs to provide node 5 with "fifth information related to a data transmission path" of the transmission path indicated by the identification information;

Indication information of a transmission path. According to the indication information, the corresponding identification information of a transmission path may be determined. Node 4 needs to provide node 5 with "fifth information related to a data transmission path" of the transmission path indicted by the indication information;

Threshold information that provide "fifth information related to a data transmission path". The threshold can be a threshold for the transmitted data volume (or the received data volume), or a threshold for a data transmission rate (or the data reception rate). The threshold may also be a threshold for the interval time of the data, or a data volume threshold for the received specific data (for example, the date whose residence time (or queuing time or storage time) in other nodes exceed a certain threshold), or may be threshold for other quantities. If it is less than the threshold, it can provide "fifth information related to a data transmission path", and if it is greater than the threshold, it can provide "fifth information related to a data transmission path". In one embodiment, the user data is transmitted to node 4 through transmission path 1. When the data volume received on the transmission path 1 by node 4 is less than the threshold, node 4 needs to provide "fifth information related a data transmission path" to node 5; on another embodiment, the user data is transmitted to node 4 through the transmission path 1, when the data volume received on one or more other transmission paths (paths other than the transmission path 1) by node 4 is greater than the threshold, then node 4 needs to provide "fifth information related to a data transmission path" to node 5; in one embodiment, the user data is transmitted by node 4 through the transmission path 1, when the data volume transmitted on the transmission path 1 by node 4 is less than the threshold, node 4 needs to provide "fifth information related a data transmission path" to node 5; in another embodiment, the user data is transmitted by node 4 through the transmission path 1, when the data volume transmitted on one or more other transmission paths (paths other than the transmission path 1) by node 4 is greater than the threshold, then node 4 needs to provide "fifth information related to a data transmission path" to node 5.

Periodic information that provide the "fifth information related to a data transmission path" (or the assistant information transmission message 2-1), the information indicates that node 4 transmits the "fifth information related to a data transmission path" (or the assistant information transmission message 2-1) to node 5. After receiving the information, node 4 will periodically transmit the "fifth information related to a data transmission path" (or the assistant information transmission message 2-1) to node 5 according to the method in step 2-1.

Information related to a data transmission state of node 5, the information includes at least one of the following information:

Identification information of the transmission path used to transmit data

Information of amount of the transmitted data (Data volume information). The information can be in bits, bytes, or the number of packets, or the percentage of the data volume on the transmission path to the total data volume (the total data volume is the total amount of user data with the same attributes processed or transmitted by node 5), and can also be expressed in other forms.

Data transmission rate information

Data reception rate information

In the above process, optionally, the assistant information request message 2-0 and the assistant information transmission message 2-1 may be user plane messages of F1 interface. For example, the assistant information request message 2-0 is an DL USER DATA message and an assistant information transmission message 2-1 is a DL DATA DELIVERY STATUS or ASSISTANCE INFORMATION DATA message; in another implementation, the assistant information request message 2-0 and an assistant information transmission message 2-1 is the control plane message of F1 interface, for example, the message 2-0 is a UE context modification request, the message 2-1 is UE context modification response; in another implementation, the assistant information request message 2-0 and the assistant information transmission message 2-1 is an RRC message, for example, the message 2-0 is RRCReconfiguration, the message 2-1 is RRCReconfigurationComplete; in another implementation, the assistant information request message 2-0 and assistant information transmission message 2-1 are different types of messages, and the possible types are user plane messages of F1 interface, control plane messages of F1 interface, and RRC messages, for example, the message 2-0 is the control plane message of F1 interface (for example, UE Context Setup/Modification Request, or other control plane message of F1 interface), and the message 2-1 is the user plane message of F1 interface, for example, DL DATA DELIVERY STATUS or ASSISTANCE INFORMA- TION DATA message. The message types used in the assistant information request message 2-0 and the assistant information transmission message 2-1 may also be other types, and the names of the two messages may also be other names.

In the above process, optionally, node 4 may be a distributed unit of the donor node or a relay node, and node 5 may be a donor node or a central unit of the donor node. In another implementation, node 4 is a relay node and node 5 is the distributed unit of the donor node or other relay node. In this implementation, the message defined in the above step 2-0 may be transmitted to node 4 by the donor node or the central unit of the donor node, and node 4 transmits the message defined in step 2-1 to node 5.

In the above process, optionally, before step 2-1, it may further include step 2-0-1, that is, other nodes (the relay nodes or the distributed units of the donor node) transmit a congestion indication message 2-0-1 to node 4, the congestion indication message informs node 4 that congestion has occurred at the other nodes. After receiving the indication message, node 4 will perform the above step 2-1. Further, the congestion indication message 2-0-1 may include at least one of the following information:
  Indication of a node congestion. In one implementation, one bit is used to indicate that a congestion has occurred at a node.
  Identification information of a transmission path. In one implementation, the transmission path is a transmission path where a congestion occurs.
  Identification information of a backhaul link channel
  Buffer state information that the other nodes serves the backhaul link channel, for example, the available buffer size, the occupied buffer size, etc.

The effect of the second aspect of the present application is that the central unit of the donor node can determine an appropriate transmission path according to the received assistant information, thereby improving the efficiency of the user data transmission. In addition, the information contained in the assistant information transmission message 2-1 in the above step 2-1 also reflects a reception state when the relay node (node 4) receives the data transmitted by the donor node or the central unit of the donor node (for example, node 5). After the donor node or the central unit of the donor node receives the assistant information transmission message 2-1, the donor node or the central unit of the donor node can adjust its data transmission and effectively perform flow control for data transmission. Therefore, another effect of the second aspect of the present application is that the donor node or the central unit of the donor node can effectively perform flow control of data transmission according to the received assistant information. If the data is transmitted through multiple paths, the donor node or the central unit of the donor node can effectively perform flow control of data transmission (for example, selecting an appropriate data transmission rate, selecting an appropriate data transmission amount, etc.) on one or more transmission paths according to the received assistant information. In order to achieve this effect, the following processes can be provided.

Step 2-1a: Node 4 transmits an assistant information transmission message 2-1a to node 5, the message contains assistant information for assisting node 5 to obtain the data reception state. For details, refer to the above assistant information transmission message 2-1;

Step 2-2a: According to the information contained in step 2-1a, node 5 can learn the transmission condition of user data on one or more transmission paths, for example, load, rate, etc., and can help node 5 effectively perform flow control of data transmission on one or more transmission paths.

Optionally, before step 2-1a, it may further include that node 4 acquires the information in the assistant information transmission message.

Optionally, before step 2-1a, it may further include step 2-0a: node 5 transmits an assistant information request message 2-0a to node 4, the message is used to indicate node 4 to provide assistant information to node 5, and for details in the message, refer to the above assistant information request message 2-0.

Optionally, before step 2-1a, it may further include step 2-0-1a, that is, other nodes (relay nodes or distributed units of donor nodes) transmit a congestion indication message 2-0-1a to node 4. For details in the message, refer to the above congestion indication message 2-0-1.

In addition, when the central unit of the donor node is divided into a central unit-control plane and a central unit-user plane, the relay node may transmit the assistant information transmission message 2-1 to the central unit-control plane. Since the transmission of the user data is controlled by the central unit-user plane, the central unit-control plane is required to provide the assistant information of the data transmission to the central unit-user plane, then the second aspect of the present application may further include the following process:

Step 2-a: Node 4 transmits an assistant information transmission message 2-a to the control plane part of node 5. The content contained in the message can refer to the above assistant information transmission message 2-1. In addition, the assistant information transmission message 2-a can also include at least one of the following information:
  Indication of a node congestion. One implementation is to use one bit to indicate that a node congestion has occurred.
  Identification information of a transmission path. One implementation is that the transmission path is a transmission path where a congestion occurs.
  Information related to a backhaul link channel served by node 4, including at least one of the following information:
    Identification information of a backhaul link channel
    indication information that the congestion has occurred at the backhaul link. The indication information indicates that the congestion (for example, cache congestion) has occurred at the resources serving the backhaul link on node 4.
    State information of the cache serving the backhaul link channel, for example, available buffer size, occupied buffer size, etc.

Step 2-b: The control plane part of node 5 transmits a request message 2-b for controlling data transmission to the user plane part of node 5. After receiving the message, the user plane part of node 5 can decide how to transmit the data, the information at least includes the following information:
  Information related to a user data attribute, see the definition in step 1-1 of the first aspect of the present application. Further, the information also indicates the attributes of the user data corresponding to the control of the data transmission.
  One or more pieces of information contained in the assistant information transmission message 2-a received in step 2-a
  Indication information for controlling the data transmission. The indication information includes at least one of the following information:

Indication information for stopping transmitting data, further, it may further include a transmission path indicating stopping data transmission (that is, stopping transmitting data on the transmission path indicated by the indication information)

Indication information for slowing down data transmission, further, may also include a transmission path indicating slowing down data transmission (that is, slowing down data transmission on a transmission path indicated by the indication information)

Indication information for speeding up data transmission, further, may also include a transmission path indicating speeding up data transmission (that is, speeding up data transmission on a transmission path indicated by the indication information)

Data transmission rate

Data volume of data transmission

Transmission path of data transmission

Step 2-c: The user plane part of node 5 controls the transmission of user data according to the information received in step 2-b. Optionally, the user plane part of the node 5 transmits a response message 2-c for controlling data transmission to the control plane part of node 5 to confirm that the message transmitted in step 2-b is received.

The request message 2-b for controlling data transmission in the above step 2-b may be a bearer context setup/modification request message (TS38.463) of E1 interface, or other messages of E1 interface, or other types of messages.

The effect of the above process is that when the central unit of the donor node includes a central unit-control plane and a central unit-user plane, after the relay node transmits assistant information to the central unit-control plane, the relay node can keep providing the relevant information to the central unit-user plane for assisting the user plane to control the user data transmission.

Figure 13:
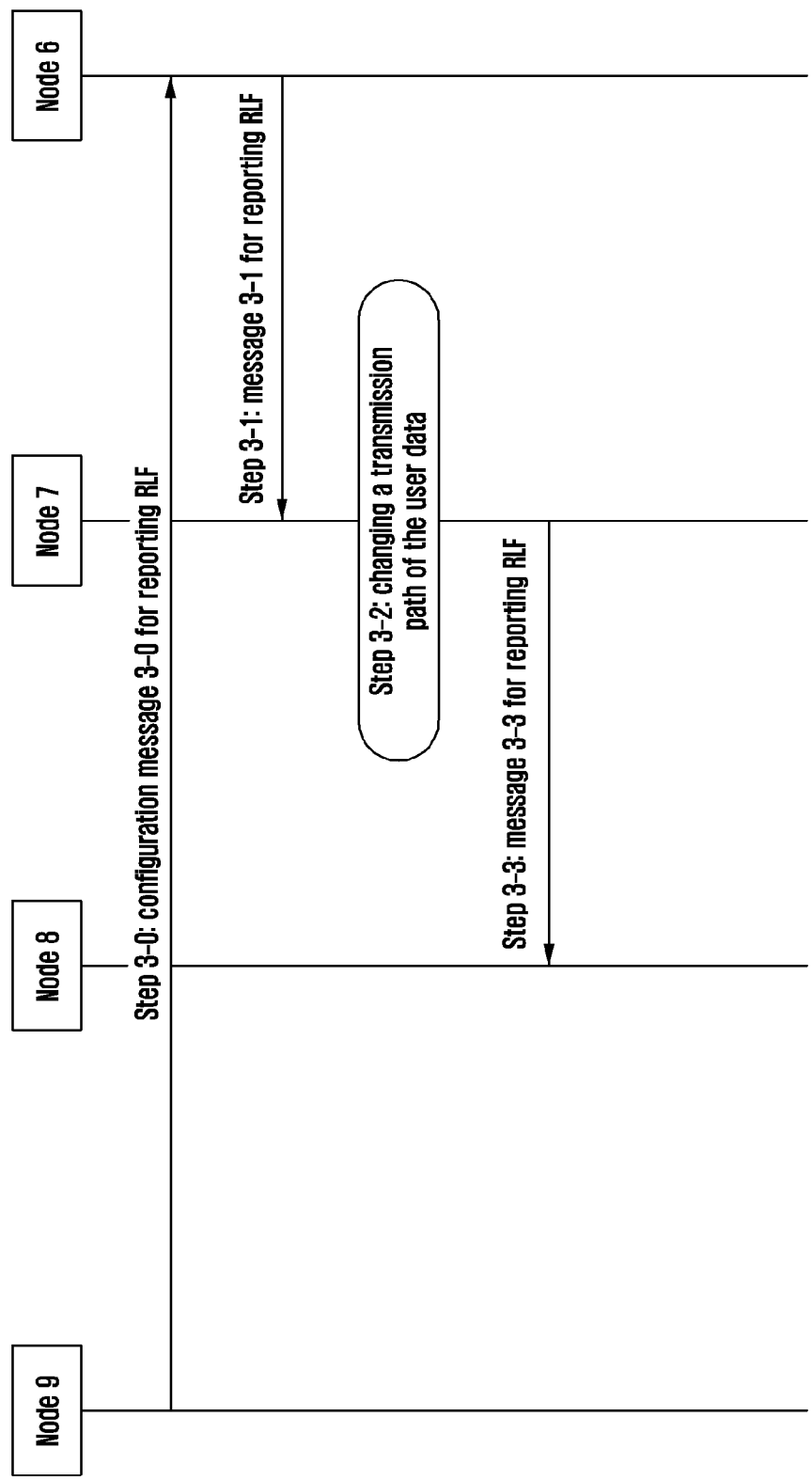
FIG. 13 is a schematic flowchart of a method for changing a transmission path according to an embodiment of the present application.

The third aspect of the present application: a data packet routing method is provided in an embodiment of the present application. In this method, after a distributed unit of a donor node or a relay node detects the RLF on the backhaul link, the distributed unit of the donor node or the relay node transmits information related to RLF to other nodes, as shown in FIG. 13, the method includes the following steps:

Step 3-1: node 6 transmits a message 3-1 for reporting RLF to node 7, this message is mainly to report information related to the RLF detected by node 6. This message is a message transmitted after the distributed unit part or the mobile terminal part of node 6 detects that the RLF occurs on the backhaul link it serves. The message includes at least one of the following information.

Indication information that an RLF occurs, the indication information indicates that node 6 detects the RLF. In one embodiment, "node 6 detects an RLF" means that the distributed unit part of the node 6 detects the RLF occurs on the backhaul link it serves; in another embodiment, "the node 6 detects an RLF" means that the mobile terminal part of the node 6 detects the RLF occurs on the backhaul link it serves; further, the indication information may also include the indication information of an entity detecting where the RLF occurs, the indication information indicates that the distributed unit part of the node 6 detects the RLF or indicates that the mobile terminal part of the node 6 detects the RLF; in addition, the indication information may also be cause information, the cause information is used to indicate that the reason that the node 6 transmits the message 3-1 for reporting RLF is that the RLF is detected;

Identification information or address information (for example, BAP address) of node 6, this node 6 is the node serving (serving by the distributed unit part or serving by the mobile terminal part) the backhaul link where the RLF occurs, In one embodiment, the information is identification information or address information (for example, BAP address) of the distributed unit of the relay node. In another embodiment, the information is identification information or address information (for example, BAP address) of the mobile terminal part of the relay node;

Indication information of a backhaul link where an RLF occurs. The indication information is used to indicate the backhaul link where the RLF occurs. The information includes at least one of the following information:

Identification information or address information (for example, BAP address) of the node serving the backhaul link (such as the relay node and the distributed unit of the donor node);

Identification information or address information (for example, BAP address) of the distributed unit part of the node (such as the relay node and the distributed unit of the donor node) serving the backhaul link;

Identification information or address information (for example, BAP address) of the mobile terminal part of the node (such as the relay node and the distributed unit of the donor node) serving the backhaul link.

Identification information or address information (for example, BAP address) of unreachable node, the unreachable node is one node in the relay network, which can be the destination receiving node of one or more transmission paths, or a destination receiving node indicated by one or more pieces of routing identification information. In one embodiment, the unreachable node is a node that cannot reach through node 6 and inferred by node 6 according to the backhaul link where the RLF occurs, and the unreachable node may be the next hop node of node 6; in another embodiment, the unreachable node may not be the next hop node of node 6. The unreachable node can be a node that the downlink data cannot reach, or may be a node that the uplink data cannot reach, or may be a node that both the uplink and downlink data cannot reach;

identification information or address information (for example, BAP address) of reachable node, the reachable node is a node in the relay network, which can be the destination receiving node of one or more transmission paths, or may be a destination receiving node indicated by one or more pieces of routing identification information. In one embodiment, the reachable node is a node can be reached by node 6 and inferred according to the backhaul link where the RLF occurs, and the reachable node may be the next hop node of node 6; in another embodiment, the reachable node may not be the next hop node of node 6. The reachable node may be a node that the downlink data can reach, or may be a node that the uplink data can reach, or may be a node that both uplink and downlink data can reach;

Identification information of a transmission path that cannot be used for data transmission. The backhaul link where the RLF occurs is in this transmission path; the transmission path that cannot be used for data transmission can be a transmission path that cannot be used for downlink data transmission, or may be a transmission path that cannot be used for uplink data transmission, or may be a transmission path that cannot be used for uplink and downlink data transmission;

Identification information of a transmission path that can be used for data transmission. The backhaul link where the RLF occurs is not in the transmission path. The transmission path that can be used for data transmission can be the transmission path that can be used for downlink data transmission, and may also be a transmission path that can be used for uplink data transmission, or may be a transmission path that can be used for uplink and downlink data transmission;

Identification information of a route that cannot be used for data transmission. The identification information of the route indicates the destination receiving node of the route and the transmission path to the destination receiving node. The route that cannot be used for data transmission can be the route that cannot be used for downlink data transmission, or may be the route that cannot be used for uplink data transmission, or may be a route that cannot be used for uplink and downlink data transmission;

Identification information of a route that can be used for data transmission. The identification information of the route indicates the destination receiving node of the route and the transmission path to the destination receiving node; the route that can be used for data transmission can be a route that can be used for downlink data transmission, or may be a route that can be used for uplink data transmission, or may be a route that can be used for uplink and downlink data transmission;

Indication information for recovering RLF, which indicates that node 6 has detected that the backhaul link where the RLF occurs has been recovered. In one embodiment, "node 6 has detected that the backhaul link where the RLF occurs has been recovered" means that the distributed unit part of node 6 detects that the backhaul link it serves has been recovered, and in another embodiment, "node 6 has detected that the backhaul link where the RLF occurs has been recovered" means the mobile terminal part of node 6 detects that the backhaul link it serves has been recovered.

Indication information that the backhaul link where the RLF occurs has been recovered, the indication information is used to indicate the backhaul link that has been recovered. The information includes at least one of the following information:

Identification information or address information (for example, BAP address) of the node serving the backhaul link (such as the relay node and the distributed unit of the donor node);

Identification information or address information (for example, BAP address) of the distributed unit part of the node (such as the relay node and the distributed unit of the donor node) serving the backhaul link;

Identification information or address information (for example, BAP address) of the mobile terminal part of the node serving the backhaul link (such as the relay node and the distributed unit of the donor node).

Step 3-2: node 7 determines a transmission path of user data. This step is an optional step. Node 7 determines whether to change the transmission path of user data according to the received message 3-1 for reporting RLF. For user data affected by the backhaul link where the RLF occurs, if node 7 can find another transmission path to transmit these user data, node 7 will change the transmission path of these data.

Step 3-3: Node 7 transmits a message 3-3 for reporting RLF to node 8. For the content of this message, refer to the above message 3-1. This step is an optional step. Node 8 is a node other than the nodes 6/7. The transmission of the message for reporting RLF by node 7 may be: forwarding the message received in step 3-1 to node 8, or updating the message received in the step 3-1 and transmitting the same to node 8. For example, the message 3-1 received from node 6 may contain "identification information or address information (for example, BAP address) of the unreachable node". If node 7 finds that one or more of the nodes indicated by the information can be reachable through other transmission paths (which may be the transmission path does not need to pass through node 6) of node 7, then node 7 can delete these reachable nodes from "identification information or address information (for example, BAP address) of unreachable node".

Optionally, before step 3-1, further includes: node 6 determines the RLF, that is, the distributed unit part or the mobile terminal part of node 6 detects that the RLF occurs on the link it serves.

Optionally, before step 3-1, it further includes: step 3-0 of configuring node 6. This step is used to configure whether node 6 transmits a message for reporting the RLF to other nodes. This step includes: node 9 transmits a configuration message 3-0 for reporting the RLF to node 6, this message includes at least one of the following information:

Indication information whether to transmit message for reporting RLF, the indication information may indicate to "transmit" or "not transmit".

Identification information or address information of the node that can be reached through other nodes (nodes other than node 6), specifically, for the node indicated by the information, other nodes can reach through other transmission paths; further, it may also include identification information or address information (for example, BAP address) of the other nodes.

Optionally, according to the configuration message 3-0 for reporting RLF, node 6 can determine whether it is necessary to transmit the message 3-1 for reporting RLF to other nodes after detecting the RLF. For the unreachable node determined by node 6, node 6 does not need to transmit message 3-1 to other nodes if the unreachable node determined by node 6 cannot be reached through other nodes, otherwise, node 6 may transmit message 3-1 to other nodes.

In the above process, optionally, node 6/7/8/9 can be any type of node in the relay network (such as the relay node, the donor node, the central unit of the donor node, and the distributed unit of the donor node). Node 7 may be a parent node of node 6 (that is, a node accessed by the mobile terminal part of node 6), or a child node of node 6 (that is, a node served by the distributed unit part of node 6). For the same reason, node 8 can be the parent node of node 7 or may be a child node of node 7.

In the above process, optionally, the "message 3-1 for reporting RLF" and/or "configuration message 3-0 for reporting RLF" may be F1 control messages, or may be RRC messages, or may be information placed in the packet header of the MAC layer, or may be information placed in the packet header of the BAP layer, or may be the information placed in the packet header of the RLC layer, or may be transmitted in any other form.

The effect of the third aspect of the present application is that when the RLF occurs in the relay node, other nodes can be notified of the RLF, and the user data can be switched to another transmission path for transmission through the notification information, thereby avoiding the interruption of user data transmission due to RLF.

Figure 14:
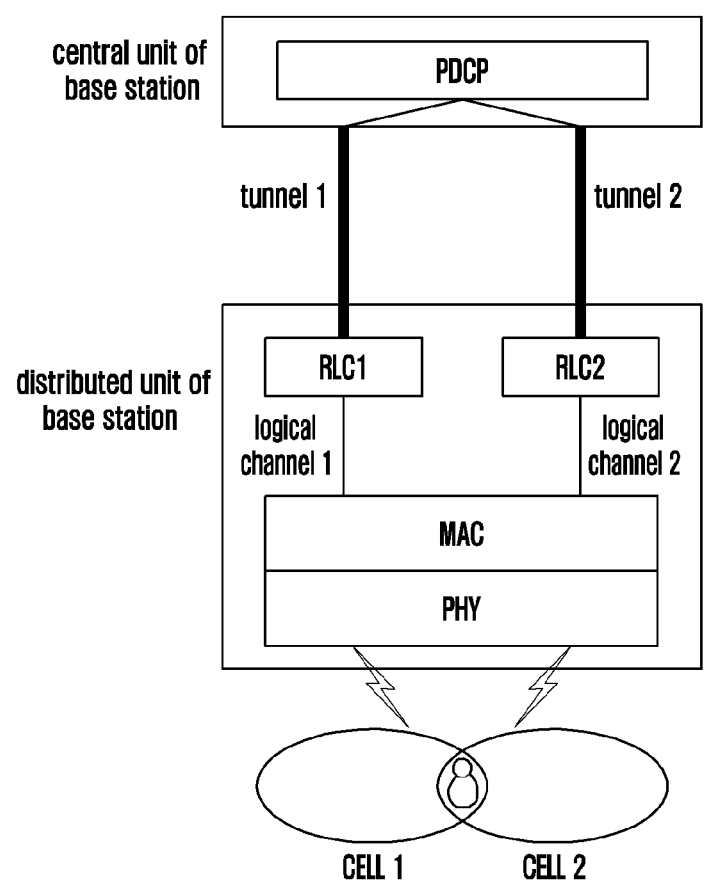
FIG. 14 is a schematic diagram of establishing two RLC entities in an existing mechanism.

The fourth aspect of the application:

In order to provide the reliability of user data transmission, the existing network supports the PDCP duplication function, that is, one packet of the PDCP layer will be duplicated into two packets and the two packets are transmitted to the user respectively. In order to support the PDCP duplication function, as shown in FIG. 14, for a PDCP packet of a user DRB, two tunnels (i.e., tunnel 1 and tunnel 2) are established between the central unit of the base station and the distributed unit of the base station to transmit two identical data packets generated by the PDCP duplication, and then hand these two identical packets to two different RLC entities (RLC1 and RLC2) and the corresponding logical channels (logical channels 1 and Logical channel 2) for transmission, and are finally transmitted to the user through two different groups of cells. Thus, in the prior art, for a user DRB, as long as two tunnels are established between the central unit of the base station and the distributed unit of the base station, the distributed unit of the base station needs to configure two RLC entities for the user DRB and the corresponding logical channels, and one or more cells serving each logical channel and the RLC entity.

Figure 15:
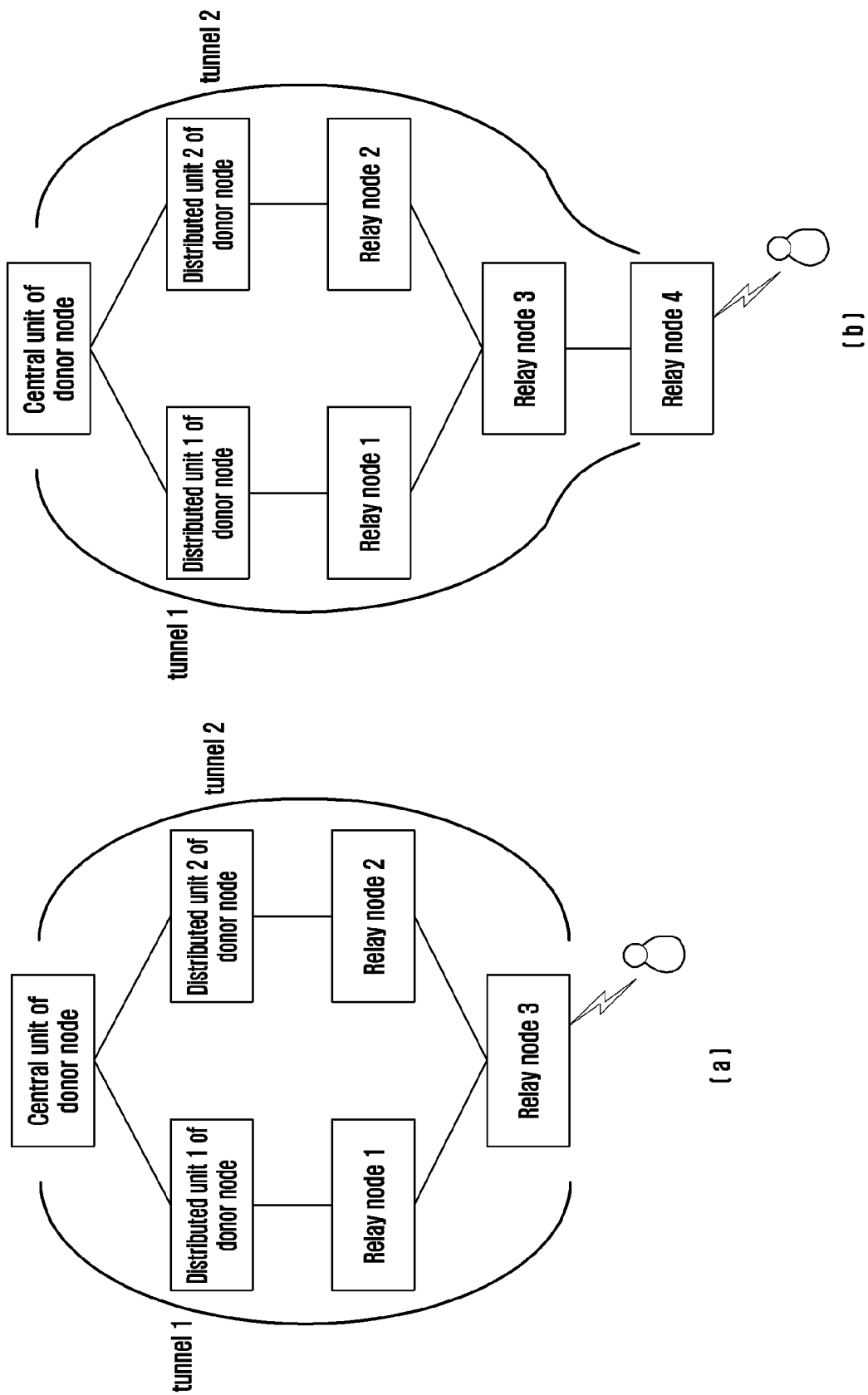
FIG. 15 is a schematic diagram of establishing two tunnels in a relay network according to an embodiment of the present application.
Figure 16:
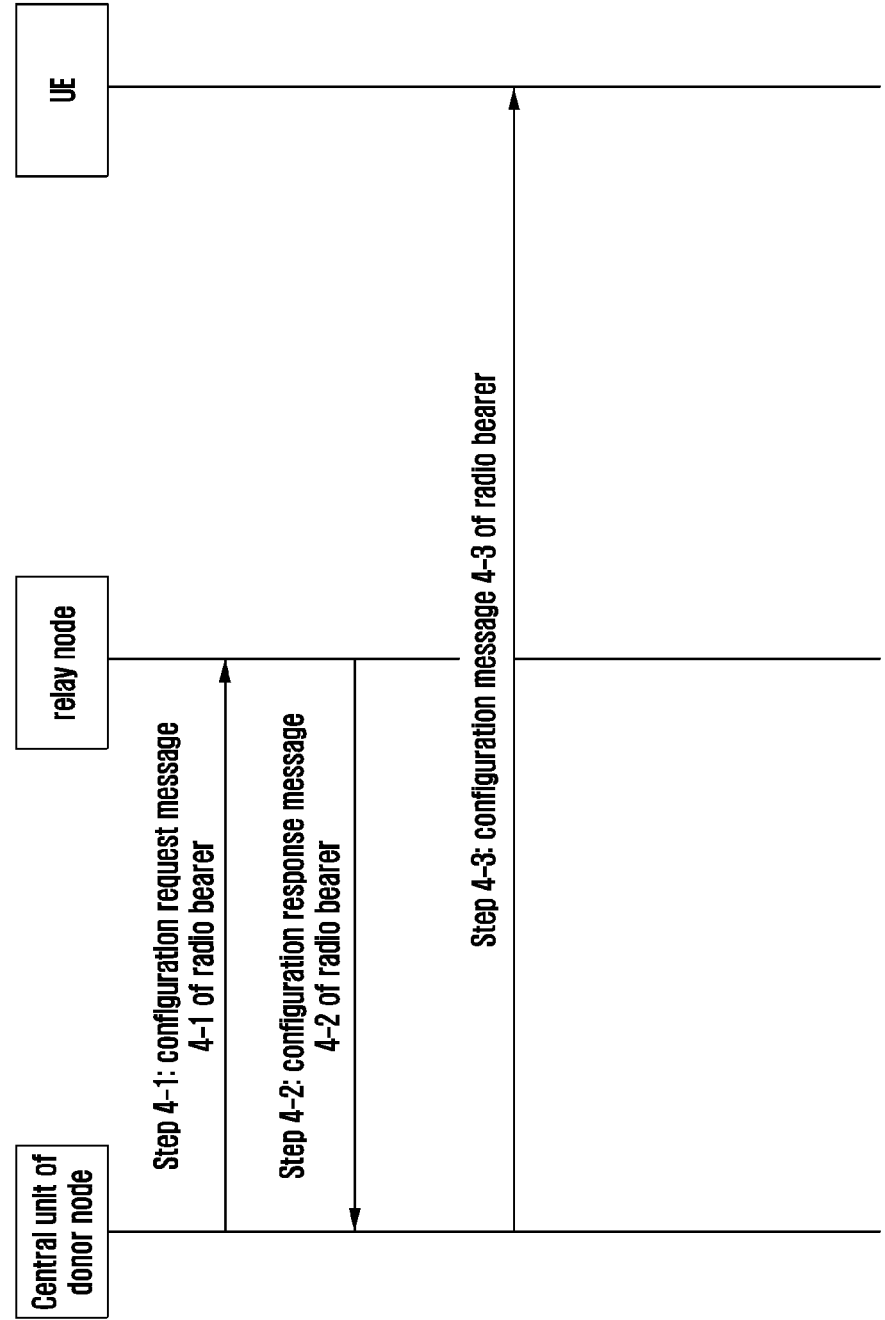
FIG. 16 is a schematic flowchart of a setup of a radio bearer according to an embodiment of the present application.

In a relay network, as shown in FIG. 15, a relay node may access the network through two or more parent nodes (nodes to which the mobile terminal part of the relay node accesses) (see the relay node 3 of FIG. 15 (*a*)), or a node directly or indirectly connected by a relay node may access the network through two or more parent nodes (for example, the relay node 4 in FIG. 15 (*b*)), in this case, the user data may be transmitted to the relay node through different transmission paths. In this case, it may be necessary to establish two or more tunnels for a user DRB. The data on different tunnels will be transmitted to the relay node through different transmission paths, as shown in FIG. 15 (*a*), tunnel 1 and tunnel 2 are established between the central unit of the donor node and the relay node 3. In FIG. 15 (*b*), tunnel 1 and tunnel 2 are established between the central unit of the donor node and the relay node 4. According to the prior art, corresponding to the DRB starting the PDCP duplication function, the distributed unit of the relay node will consider that it is necessary to establish two different RLC entities for the DRB, and each RLC entity will configure corresponding logical channels, and also configure one or more cells serving each RLC entity and the corresponding logical channel. However, in the relay network, the purpose of establishing two tunnels is to transmit user DRB data to the distributed unit part of the relay node via different transmission paths. Therefore, the distributed unit part of the relay node does not need to configure DRB according to the prior art. In order to make the distributed unit of the relay node to correctly configure the user DRB, a data packet routing method is provided in the embodiment of the present application. As shown in FIG. 16, the method includes the following steps:

Step 4-1: The central unit of the donor node transmits a configuration request message of a user bearer 4-1 to the distributed unit part of the relay node. This message is used to configure the user DRB. The message includes at least one of the following information:

Identification information of user DRB;

Address information of two (or more than two) tunnels on the central unit side of the donor node, for example, transport layer information (such as IP address, and/or GTP-TEID (GTP Tunnel endpoint Identifier)); address information for each tunnel, further, may also include information related to the data transmitted over the tunnel, such as information of the amount of the transmitted data, and the percentage information of the transmitted data (for example, percentage of transmitted data to the data transmitted on all the tunnels for transmitting the user DRB data (or uplink data, or downlink data)), information of the rate for transmitting data, and the condition information (such as threshold information, for example, enable the tunnel when the number of data transmitted over another tunnel exceeds the threshold) to enable a tunnel.

Indication information for configuring RLC entity. The indication information is used to indicate the distributed unit of the relay node whether two (or more than two) RLC entities need to be configured for the user DRB. In one embodiment, the indication information is the indication information of PDCP duplication configuration (indicating whether to configure the PDCP duplication function for the user DRB. If the PDCP duplication function is not configured, there is no need to configure two (or more than two) RLC entities for the user DRB. If the PDCP duplication function is configured, two (or more than two) RLC entities need to be configured for the user DRB). In another embodiment, the indication information is the indication information for configuring two (or more than two) RLC entities, in another embodiment, the indication information is the indication information for configuring two (or more than two) logical channels. Further, if the indication information indicates that there is no need to configure two (or more than two) entities (or there is no need to configure PDCP duplication function or there is no need to configure two (or more than two) logical channels, then in step 4-2, the relay node does not need to transmit address information of two (or more than two) tunnels to the donor node or the central unit of the donor node. In another embodiment, the indication information may be transmitted in an implicit method, if the certain information is not contained, the indication information implicitly indicates that there is no need to configure two or more than two RLC entities, or there is no need to configure two or more than two logical channels, the certain information may be Duplication Activation information in TS38.473 (the Duplication Activation information is used to indicate the initial state of the PDCP duplication function, for example, the initial state is "activation" or "inactivation").

Indication information of the number of the configured RLC entities. If the information is received, in step 4-2, it is necessary to provide the address information of the same number of tunnels.

Indication information of the number of the configured logical channels. If the information is received, in step 4-2, it is necessary to provide the address information of the same number of tunnels.

Indication information providing address information of two (or more than two) tunnels; if the information is received, in step 4-2, it is necessary to provide address information of two or more tunnels, further, even if the PDCP duplication function is not configured, it is also necessary to provide address information of two or more than two tunnels.

Information about the required number of the address information of tunnels, for example, such as one, two, etc. If the information is received, the number of address information of tunnels provided in step 4-2 needs to be the number indicated by the information about number. Further, even if the PDCP duplication function is not configured, in step 4-2, it is also necessary to provide the tunnel address information according to the information about number.

Step 4-2: the distributed unit part of the relay node transmits a configuration request response message 4-2 to the central unit part of the donor node, and the message includes at least one of the following information:

Identification information of user DRB;

Address information of the two (or more than two) tunnels on the relay node side, such as transport layer information (such as IP addresses, and/or GTP-TEID (GTP Tunnel endpoint Identifier)); further, the number of the address information of the provided tunnels is determined according to the information received in step 4-1. If the information in step 4-1 indicates to provide address information of one tunnel, then only address information of one tunnel is provided in step 4-2, if it indicates to provide two, then address information of two tunnels is provided in step 4-2

Configuration information of user DRB. If the message 4-1 indicates that it is necessary to establish two (or more than two) RLC entities for the user DRB, then the configuration information will include configuration information of two (or more than two) RLC entities, further, it may also include logical channel information corresponding to each RLC entity, and/or information of one or more cells serving each logical channel (cell identification information), if the message 4-1 indicates that it is unnecessary to establish two (or more than two) RLC entities, then the configuration information will include configuration information of one RLC entity, further, it may also include logical channel information corresponding to the RLC entity, and/or information of one or more cells serving each logical channel (for example, cell identification information).

Step 4-3: The central unit of the donor node transmits the configuration information received in step 4-2 to the user through the radio bearer configuration message 4-3. The configuration information is transmitted by the central unit of the donor node to the relay node, and then configuration information is transmitted by the relay node to the user.

Optionally, the above message 4-1 and message 4-2 may be UE Context Setup/Modification Request and UE Context Setup/Modification Response messages, respectively, and the above radio bearer configuration message 4-3 may be an RRCReconfiguration message.

The above method can configure a route of user data in a multi-hop network, that is, configure a transmission path of user data, and each transmission path corresponds to a tunnel.

In addition to configure user data routing, the above method can also be used to configure user radio bearer in a multi-hop network.

The effect of the fourth aspect of the present application is that after receiving the two or more pieces of address information transmitted by the central unit of the donor node, the relay node may decide whether it is necessary to establish two or more than two RLC entities for the user DRB, thereby effectively using resources on the relay node side. If the information in the message 4-1 indicates that it is not necessary to configure two or more than two RLC entities (that is, the PDCP duplication function is not enabled), it indicates that the addresses of the multiple tunnels are used to transmit different data of the same DRB. Another effect of this method is that the data of one user DRB can be transmitted to the relay node through different transmission paths, and each path has the corresponding tunnel address information. One implementation is that one tunnel represents one transmission path.

Figure 15A:
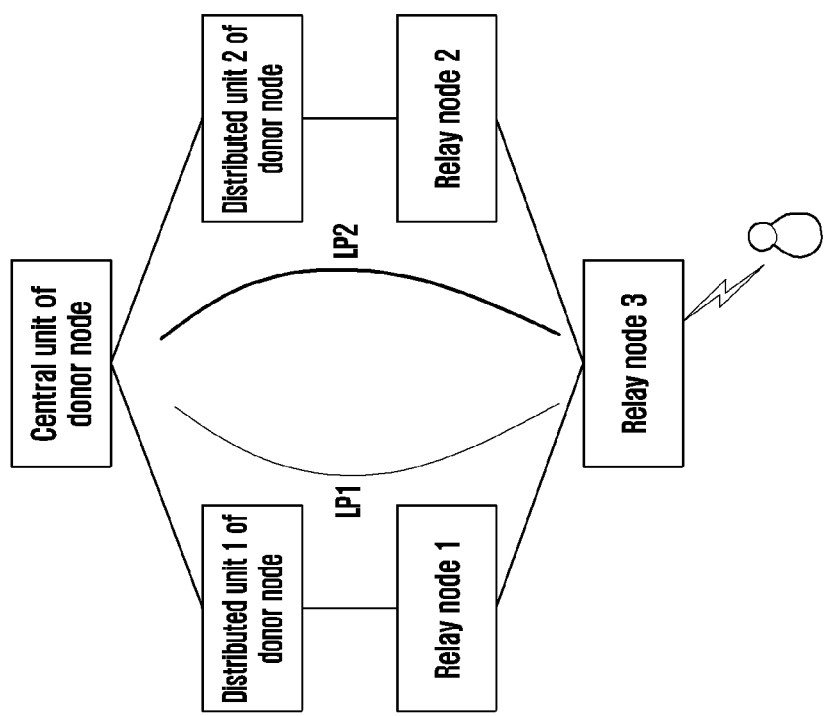
FIG. 15a is a schematic diagram of the relay node receiving data by using different IP addresses in the existing mechanism.

The fifth aspect of the present application:

In a relay network, a relay node may access a central unit of a donor node through two or more distributed units of donor node(s), and the relay node may be directly connected to the distributed unit of each donor node, or it may also be indirectly connected to the distributed unit of each donor node through one or more relay nodes. When the central unit of the donor node transmits data to the relay node, the distributed units of the donor node which are passed through by the data are different, the addresses (such as IP addresses) used by the relay node side would be different. As shown in FIG. 15*a*, there are two transmission paths between the relay node 3 and the central unit of the donor node, and the distributed units of the donor node that are passed by each transmission path are different, the relay node 3 would communicate with the central units of donor nodes through different IP addresses. For example, the relay node 3 has two IP addresses (IP1 and IP2), if the central unit of the donor node transmits data to the relay node through a distributed unit 1 of the donor node, the relay node 3 needs to use IP1, which is used as a destination address for receiving data packets transmitted by the central unit of the donor node, so that the data packet will pass through the distributed unit 1 of the donor node; if the central unit of the donor node transmits data to the relay node through the distributed unit 2 of the donor node, the relay node 3 needs to use IP2, which is used as a destination address for receiving data packets transmitted by the central unit of the donor node, so that the data packet will pass through the distributed unit 2 of the donor node. However, in the prior art, the transmission path of the data packet is determined by the central unit of the donor node, and the address for receiving the data packet at the relay node side is determined by the relay node and notified to the donor node through signaling. Therefore, the relay node cannot know the transmission path selected by the central unit of the donor node when determining the address, which may cause the relay node to select an inappropriate or wrong IP address.

Figure 16A:
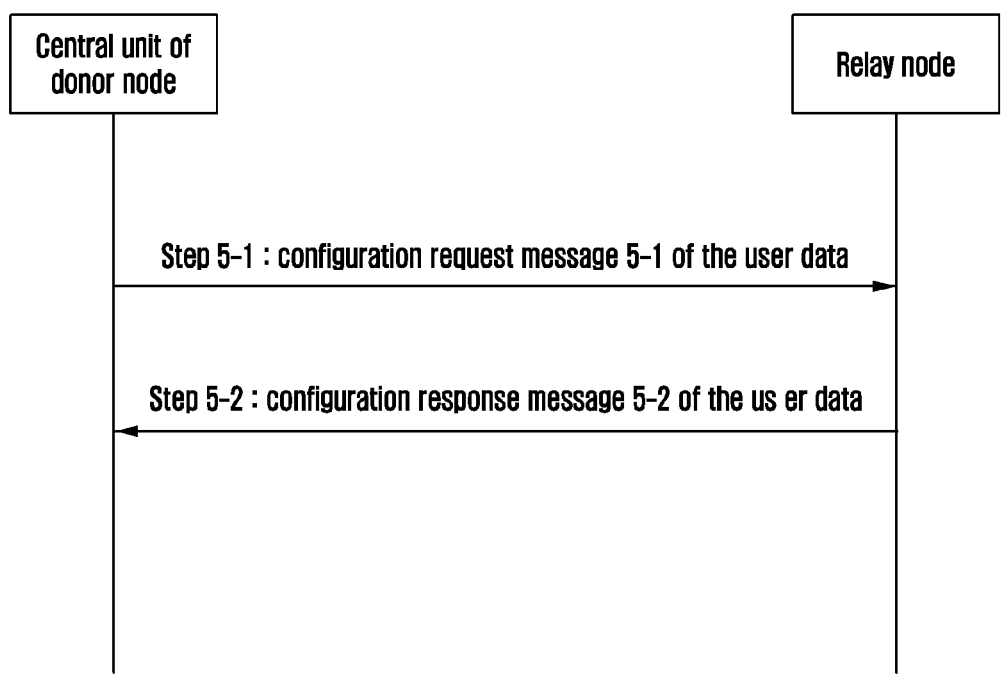
FIG. 16a is a schematic flowchart of configuring a user data transmission path according to an embodiment of the present application.

In order to help the relay node select an appropriate address for receiving user data, an embodiment of the present application provides a method for configuring a user data transmission path. As shown in FIG. 16*a*, the method includes the following steps:

Step 5-1: the central unit of the donor node transmits a configuration request message 5-1 of the user data to the distributed unit part of the relay node, and the message is used to configure the transmission of user data. The relay node may be directly connected to the donor node, or may be connected to the donor node through one or more other nodes. The message includes at least one of the following information:

Information related to the configuration of user data, and the information includes at least one of the following:
Identification information of user DRB
Type information of user data, such as user-associated control signaling (UE-associated F1AP), non-user-associated control signaling (non-UE-associated F1AP), non-F1 interface data (non-F1 traffic)
Information about the tunnel address on the central unit side of the donor node, such as transport layer information (e.g., IP addresses), and/or GTP-TEID (GTP Tunnel endpoint Identifier);

Configuration information related to the transmission path of user data; the user data may be uplink data (which is transmitted by the relay node to the central unit of the donor node) or downlink data (which is transmitted by the central unit of the donor node to the relay node), or may also include both uplink data and downlink data. In addition, if the user data is data of user DRB, the configuration information may be given for each user DRB, or may be given for each (uplink/downlink) tunnel of each user DRB. In another embodiment, the user data may include both data of users accessing the distributed unit part of the relay node and data generated by the distributed unit part of the relay node itself (such as F1AP messages, non-F1 data, etc.); one possible case is that the configuration information related to the transmission path of the user data is suitable to all the user data, and another possible case is that the configuration information is only suitable to a part of the user data. The information includes at least one of the following:

- Identification information of the transmission route (the identification information may include the BAP address of the node and the identification information of the transmission path); for uplink data, the BAP address contained in the identification information is the address information of the destination receiving node in the transmission path, the destination receiving node is a distributed unit of the donor node (or the donor node, or the central unit of the donor node); further, the BAP address in the identification information may be used to indicate address information of the distributed unit of the donor node (or the donor node, or the central unit of the donor node) that the transmission path of the downlink data passes through, which indicates that the uplink and downlink data of the user will pass through the same distributed unit of the donor node (or the same donor node, or the same central unit of donor node). According to this information, the relay node can determine the address information (IP address) used by it when receiving the downlink data, that is, the address corresponding to the BAP address contained in the identification information;
- The address information of the distributed unit of the donor node (or the donor node, or the central unit of the donor node) that the user data transmission path passes through, such as BAP address, IP address; in one embodiment, the node indicated by the information is the distributed unit of the donor node (or the donor node, or the central unit of the donor node) that the transmission path of the uplink data passes through; further, when both the uplink data and the downlink data of the user pass through the same distributed unit of the donor node (or the same donor node, or the same central unit of the donor node), the information also indicates the distributed unit of the donor node (or the donor node, or the central unit of the donor node) that the transmission path of the downlink data passes through; according to the information, the relay node can determine the address information (IP address) used by it when receiving downlink data;
- Identification information of the transmission path of user data; in one embodiment, the transmission path is the transmission path of the uplink data; further, the information also indicates the transmission path of the downlink data, which indicates that both the uplink data and the downlink data of the user use the same transmission path; according to the information, the relay node can determine the address information (IP address) used by it when receiving downlink data;
- Address information of the next hop node (such as BAP address); in one embodiment, the address information of the next hop node is the address information of the node that receives the data (or uplink data) transmitted by the relay node;
- Identification information of the backhaul link channel used to transmit user data; in one embodiment, the backhaul link channel may be the backhaul link channel used by the relay node to transmit data (or uplink data);
- The assistant information for determining the transmission path; the information is used to help the relay node determine the address information used to receive the downlink data; the information may include one of the following information:
  - The identification information of the distributed unit of the donor node (or the donor node, or the central unit of the donor node) that the transmission path of the downlink data passes through, such as BAP address, IP address, gNB-DU ID, etc.; further, it may also include the address information of the relay node side corresponding to the identification information, such as one or more BAP addresses and one or more IP addresses; in another embodiment, if the downlink data needs to pass through multiple distributed units of donor node(s), it may also include the identification information of multiple distributed units of donor node(s), such as multiple BAP addresses or multiple IP addresses;
  - The address information used when receiving downlink data; the address information is information on the relay node side, such as IP address, BAP address; further, if the information is the BAP address of the relay node, the information may also include one or more IP addresses of the relay node side corresponding to the BAP address;
  - The indication information used to determine the downlink address of the relay node, the downlink address is used by the relay node to receive the downlink data; in one embodiment, the indication information is identification information of the distributed unit of the donor node (or the donor node, or the central unit of the donor node), such as BAP address; in another embodiment, the information is identification information of the relay node, such as BAP address, IP address, etc.; in another embodiment, the information is identification information of the transmission path of the downlink data; in another embodiment, the information is routing identification information for transmitting downlink data (the information includes the BAP address of the destination receiving node and the identification of the transmission path);
  - Identification information of the transmission path used to transmit the downlink data
  - Routing identification information used to transmit downlink data (the information includes the BAP address of the destination receiving node and the identification of the transmission path);

The indication information of the set to which the address used when receiving downlink data belongs; in one embodiment, the relay node has multiple addresses (such as IP address, BAP address); these addresses are divided into different groups; the indication information is used to help the relay node determine from which group the address used when receiving the downlink data should be selected;

The indication information of the cell group used by the relay node to receive the downlink data; the information indicates the cell group used to receive the downlink data, such as MCG (master cell group), SCG (secondary cell group), cell group ID, etc.

The identification information of the previous hop node for transmitting the downlink data; the previous hop node is the node that transmits downlink data of the user to the relay node; the identification information may be BAP address, gNB-DU ID, etc.

The indication information of the distributed unit of the donor node (or the donor node, or the central unit of the donor node) that the transmission path of the downlink data passes through; in one embodiment, the indication information indicates that the distributed unit of the donor node (or the donor node, or the central unit of the donor node) that the transmission path of the downlink data passes through is different from the distributed unit of the donor node (or the donor node, or the central unit of the donor node) that the transmission path of the uplink data passes through.

Step 5-2: the distributed unit part of the relay node transmits a user data configuration request response message 5-2 to the central unit part of the donor node. The message includes at least one of the following information:

Identification information of user DRB

Type information of user data, such as user-associated control signaling (UE-associated F1AP), non-user-associated control signaling (non-UE-associated F1AP), non-F1 interface data (non-F1 traffic)

Information about the tunnel address on the relay node side, such as transport layer information (e.g., IP addresses), and/or GTP-TEID (GTP Tunnel endpoint Identifier); further, the IP address in the information is determined based on information received in step 5-1; in one embodiment, the information related to the address may be used to indicate the tunnel address on the relay node side, such as the transport layer address, and/or GTP-TEID; in another embodiment, the information related to the address is information about the tunnel address on the relay node side, such as transport layer information (e.g., IP address), and/or GTP tunnel endpoint identifier (GTP-TEID).

Optionally, the above message 5-1 and message 5-2 may be F1AP messages, for example, the above message 5-1 and message 5-2 may be UE Context Setup/Modification Request and UE Context Setup/Modification Response messages, respectively; in another embodiment, the above message 5-1 and message 5-2 may be gNB-CU Configuration Update and gNB-CU Configuration Update Acknowledge messages, respectively; in another embodiment, there may be only the above step 5-1, and the message 5-1 may be an F1 Setup Response or a gNB-DU Configuration Update Acknowledge message; in another embodiment, the above message 5-1 and message 5-2 may be RRC messages. In this embodiment, the message 5-1 may be transmitted by the central unit of the donor node to the mobile terminal part of the relay node, the message 5-2 may be transmitted by the mobile terminal part of the relay node to the central unit of the donor node; after receiving the message 5-1, the mobile terminal part of the relay node may determine the address information used by the distributed unit part of the relay node for transmitting user data based on the information included in the message 5-1; in this embodiment, the above message 5-1 and message 5-2 may respectively be RRCReconfig/RRCConnectionReconfig message and RRCReconfigComplete/RRCConnectionReconfigComplete message; for another example, it may only have above step 5-1, then the message 5-1 may be a DLInformation message, or other RRC messages (existing or newly defined); in another embodiment, the above message 5-1 and message 5-2 may be newly defined messages.

The effect of the fifth aspect of the present application is that after receiving the configuration information for transmitting user data transmitted by the central unit of the donor node, the relay node determines the IP address information required for receiving downlink data, and further, according to the address information, the relay node may feedback the tunnel information set for receiving downlink data to the central unit of the donor node.

Embodiment 2

Figure 17:
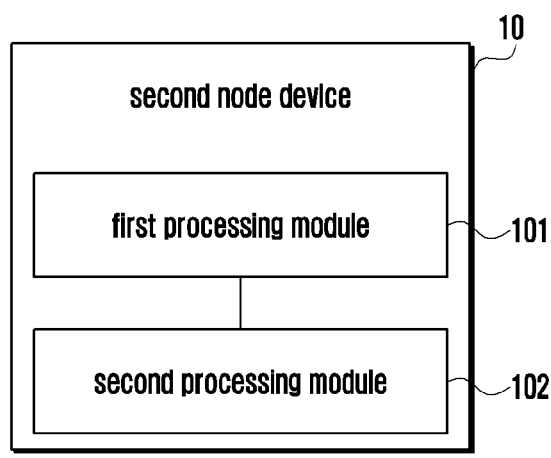
FIG. 17 is a schematic structural diagram of a second node device according to an embodiment of the present application.

Based on the same inventive concept of the foregoing embodiments, an embodiment of the present application further provides a second node device. The schematic structural diagram of the device is shown in FIG. 17. The second node device 10 includes a first processing module 101 and a second process module 102.

The first processing module 101 is configured to receive a first message transmitted by a first node;

The second processing module 102 is configured to determine a transmission path of a data packet according to the first message.

Optionally, the first message includes at least one of the following: first information related to a user data attribute, second information related to a transmission path, indication information indicating whether other transmission paths can be enabled, indication information for activating or deactivating a transmission path, and seventh information related to routing.

Optionally, the first information related to a user data attribute includes at least one of the following: user data attribute indication information, user identification information, data radio bearer (DRB) identification information, signaling radio bearer (SRB) identification information, user radio bearer identification information, control signaling type information, identification information of a backhaul link channel used by the second node to receive use data, identification information of a backhaul link channel used by the second node to transmit user data, identification information and/or address information (for example, BAP address) of the destination receiving node of the user data, and routing identification information of the user data, identification information of a transmission path of user data, indication information of uplink and downlink data, and indication information of a retransmitted data packet.

Optionally, the second information related to a transmission path includes at least one of the following: identification information of a transmission path, identification information of a primary transmission path, indication information of a primary transmission path, address information (for example, BAP address) or identification information of the destination receiving node of the transmission path, routing identification information of a transmission path, condition information for enabling a transmission path, information of the amount of the data transmitted on a transmission path, quality of service (QoS) information of the data transmitted on the transmission path, and identification information of a backhaul link channel for transmitting user data on a backhaul link between the second node and a next hop node indicated by the transmission path.

Optionally, the seventh information related to routing includes at least one of the following: address information of a second node, address information of a distributed unit of a donor node, IP address information of a distributed unit of a donor node, IP address information of a central unit of a donor node, one or more routing table entries, information of one or more slices supported.

Optionally, the second node adds third information related to a transmission path modification to the data packet during the data packet transmission process, and the third information includes at least one of the following: address information (for example, BAP address) or identification information of the nodes for modifying transmission path; at least one of transmission path information, routing identification information, and identification information or address information (for example, BAP address)) of the destination receiving node contained in the data packet before modifying the transmission path; at least one of transmission path information, routing identification information, and identification information or address information (for example, BAP address) of the destination receiving node contained in the data packet after modifying the transmission path.

Figure 18:
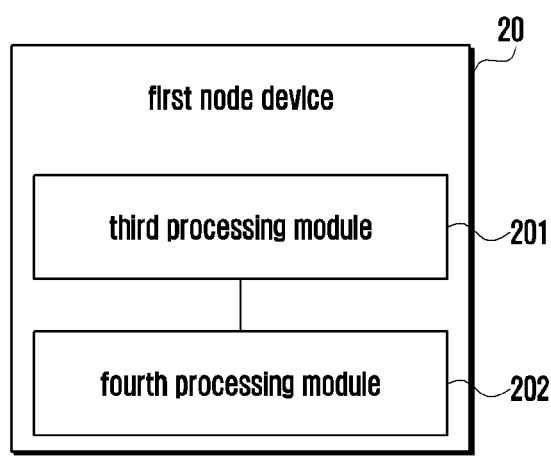
FIG. 18 is a schematic structural diagram of a first node device according to an embodiment of the present application.

Based on the same inventive concepts of the foregoing embodiments, an embodiment of the present application further provides a first node device. A schematic structural diagram of the device is shown in FIG. 18. The first node device 20 includes a third processing module 201 and a fourth processing module 202.

The third processing module 201 is configured to transmit a first message to a second node, for the second node to determine a transmission path of a data packet according to the first message;

The fourth processing module 202 is configured to receive a second message transmitted by the second node, for confirming that the second node has received the first message.

Figure 19:
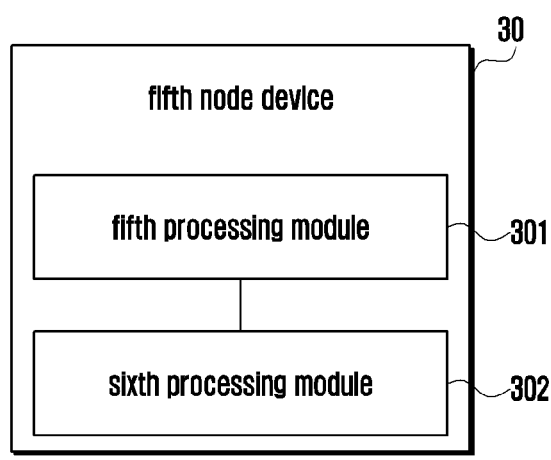
FIG. 19 is a schematic structural diagram of a fifth node device according to an embodiment of the present application.

Based on the same inventive concepts of the foregoing embodiments, an embodiment of the present application further provides a fifth node device. A schematic structural diagram of the device is shown in FIG. 19. The fifth node device 30 includes a fifth processing module 301 and a sixth processing module 302.

The fifth processing module 301 is configured to receive a third message transmitted by a fourth node, and the third message includes assistant information for assisting the fifth node to determine a data packet transmission;

The sixth processing module 302 is configured to determine a data packet transmission according to the third message.

Optionally, the third message includes at least one of the following: fourth information related to a user data attribute, fifth information related to a data transmission path, identification information or address information (for example, BAP address) of a node when the transmission path of the user data is changed, and information of the transmission path suggested by the fourth node.

Optionally, the fifth information related to a data transmission path includes at least one of the following: indication information of the type of the transmission path, identification indication information of the transmission path, and sixth information related to data on the transmission path.

Optionally, the information of the transmission path suggested by the fourth node includes at least one of the following: identification information of one or more transmission paths suggested by the fourth node, and indication information of one or more transmission paths suggested by the fourth node.

Figure 20:
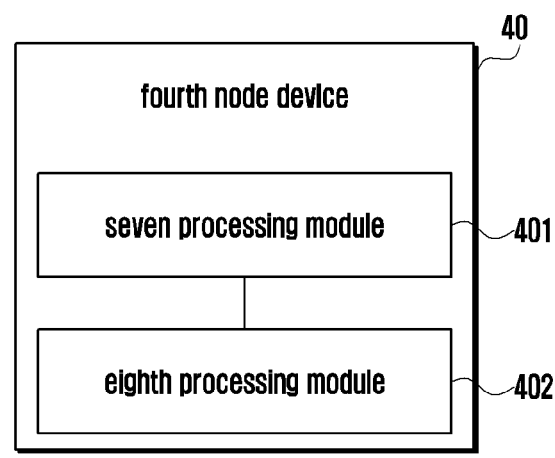
FIG. 20 is a schematic structural diagram of a fourth node device according to an embodiment of the present application.

Based on the same inventive concept of the foregoing embodiments, an embodiment of the present application further provides a fourth node device. A schematic structural diagram of the device is shown in FIG. 20. The fourth node device 40 includes a seventh processing module 401 and an eighth processing module 402.

The seventh processing module 401 is configured to acquire a third message;

The eighth processing module 402 is configured to transmit a third message to a fifth node, and the third message includes assistant information for assisting the fifth node to determine a data packet transmission.

The seventh processing module 401 is further configured to receive a fourth message transmitted by the fifth node, for indicating the fourth node to provide the assistant information to the fifth node.

Figure 21:
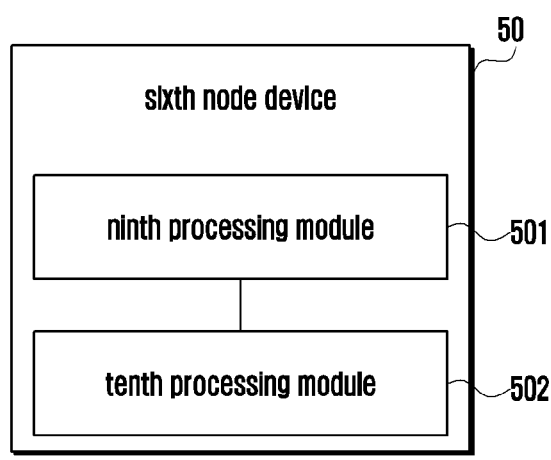
FIG. 21 is a schematic structural diagram of a sixth node device according to an embodiment of the present application.

Based on the same inventive concept of the foregoing embodiments, an embodiment of the present application further provides a sixth node device. A schematic structural diagram of the device is shown in FIG. 21. The sixth node device 50 includes a ninth processing module 501 and a tenth processing module 502.

The ninth processing module 501 is configured to determine an RLF;

The tenth processing module 502 is configured to transmit a fifth message to a seventh node, for determining a transmission path of a data packet.

Optionally, the fifth message includes at least one of the following: RLF indication information, identification information or address information (for example, BAP address) of the sixth node, indication information of the backhaul link where the RLF occurs, identification information or address information (for example, BAP address) of unreachable nodes, identification information or address information (for example, BAP address) of reachable nodes, identification information of transmission paths that cannot be used for data transmission, identification information of transmission paths that can be used for data transmission, identification of information of a route that cannot be used for data transmission, identification information of a route that can be used for data transmission, indication information for recovering RLF, and indication information that a backhaul link where RLF occurs has been recovered.

Optionally, the indication information of a backhaul link where the RLF occurs includes at least one of the following: identification information or address information (for example, BAP address) of the node serving the backhaul link, identification information or address information (for example, BAP address) of the distributed unit part of the node serving the backhaul link, and identification information or address information (for example, BAP address) of the mobile terminal part of the node serving the backhaul link.

Optionally, the indication information that a backhaul link where RLF occurs has been recovered includes at least one of the following: identification information or address information (for example, BAP address) of the node serving the backhaul link, identification information or address information (for example, BAP address) of the distributed unit part of the node serving the backhaul link, and identification information or address information (for example, BAP address) of the mobile terminal part of the node serving the backhaul link.

Figure 22:
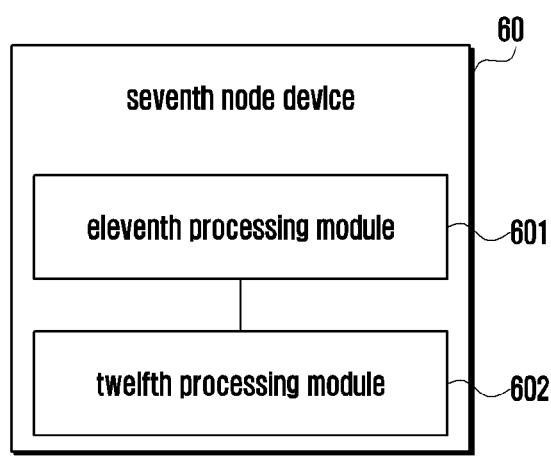
FIG. 22 is a schematic structural diagram of a seventh node device according to an embodiment of the present application.

Based on the same inventive concept of the foregoing embodiments, an embodiment of the present application further provides a seventh node device. A schematic structural diagram of the device is shown in FIG. 22. The seventh node device 60 includes an eleventh processing module 601 and a twelfth processing module 602.

The eleventh processing module 601 is configured to receive a fifth message transmitted by a sixth node;

The twelfth processing module 602 is configured to determine a transmission path of a data packet according to the fifth message.

Figure 23:
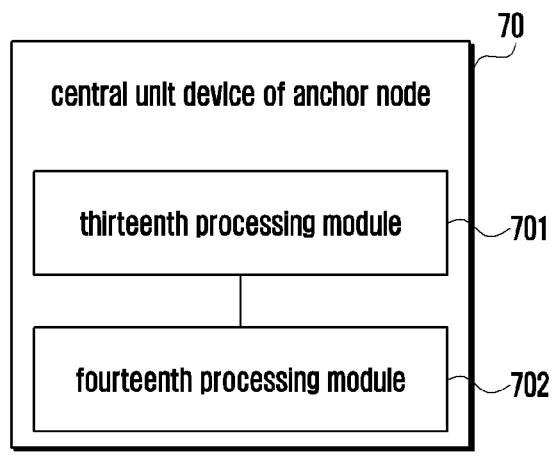
FIG. 23 is a schematic structural diagram of a central unit device for a donor node according to an embodiment of the present application.

Based on the same inventive concept of the previous embodiments, this embodiment of the present application also provides a central unit device of a donor node. A schematic structural diagram of the device is shown in FIG. 23. The central unit device 70 of the donor node includes a thirteenth processing module 701 and a fourteenth processing module 702.

The thirteenth processing module 701 is configured to transmit a sixth message to a relay node, for configuring a user DRB to which the routing data belongs;

The fourteenth processing module 702 is configured to receive a seventh message transmitted by the relay node, for confirming that the sixth message is received, or confirming that the configuration process of the radio bearer is successfully completed.

Optionally, the sixth message includes at least one of the following: identification information of a user's DRB, address information of two or more tunnels on a central unit side of a donor node, and indication information for configuring a radio link control protocol (RLC) entity.

Optionally, the seventh message includes at least one of the following: identification information of a user's DRB, address information of two or more tunnels on a relay node side, and configuration information of a user's DRB.

Figure 24:
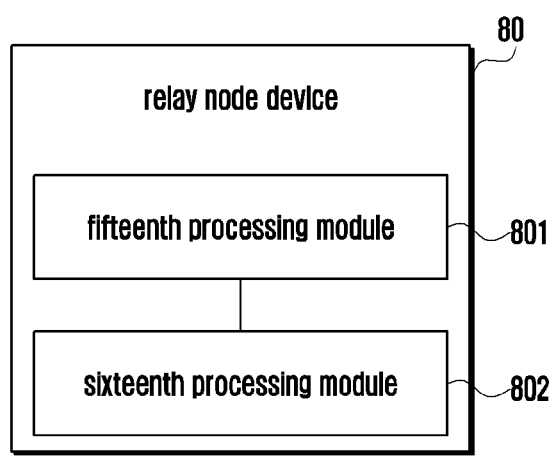
FIG. 24 is a schematic structural diagram of a relay node device according to an embodiment of the present application.

An embodiment of the present application further provides a relay node device. A schematic structural diagram of the device is shown in FIG. 24. The relay node device 80 includes a fifteenth processing module 801 and a sixteenth processing module 802.

The fifteenth processing module 801 is configured to receive a sixth message or an eighth message transmitted by a central unit of a donor node, for configuring a user DRB to which the routing data belongs;

The sixteenth processing module 802 is configured to transmit a seventh message or a ninth message to the central unit of the donor node.

For contents not specified in the data packet routing device provided in the embodiment of the present application, reference may be made to the foregoing data packet routing method. The beneficial effects that can be achieved by the data packet routing device provided in the embodiment of the present application is the same as the above data packet routing method, and will not be repeated here.

The embodiments of the present application have at least the following beneficial effects:

1) The relay node can determine the conditions for transmitting user data using other transmission paths, thereby effectively using multiple transmission paths to complete the user data transmission.

2) The central unit of the donor node can determine the appropriate transmission path according to the received assistant information, and improve the efficiency of user data transmission. Another effect is that the donor node or the central unit of the donor node can effectively perform flow control of data transmission according to the received assistant information. If the data is transmitted through multiple paths, the donor node or the central unit of the donor node can perform flow control of data transmission on one or more transmission paths effectively according to the received assistant information (such as selecting an appropriate data transmission rate, selecting an appropriate data transmission volume, etc.).

3) When the RLF occurs in the relay node, other nodes may be notified of the RLF, and the user data is switched to other transmission paths for transmission to avoid the interruption of the user data transmission due to the RLF.

4) After receiving the address information of two or more tunnels transmitted by the central unit of the donor node, the relay node can decide whether it is necessary to establish two or more RLC entities for the user DRB according to the information in the configuration request message of the radio bearer, thereby effectively using resources on the relay node side.

5) After receiving the configuration information related to the transmission path of user data transmitted by the central unit of the donor node, the relay node can determine the address information used by it when receiving the downlink data, thereby maintain the transmission path of the downlink data be consistent with the address information used by the relay node.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present invention. It should be noted that, for a person of ordinary skill in the art, various modifications and embellishments can be made without departing from the principle of the present invention. Such modifications and embellishments shall be regarded as falling into the protection scope of the present invention.

The invention claimed is:

1. A method performed by a first integrated access and backhaul (IAB) node in a multi-hop network, the method comprising:
   receiving, from a central unit (CU) of a donor node, a user equipment (UE) context setup or modification request message including information on a backhaul adaptation protocol (BAP) address of a distributed unit (DU) of the donor node, via which downlink data of the first IAB node is transmitted, wherein the DU of the donor node is a destination receiving node on a BAP layer for uplink data from the first IAB node; and
   transmitting, to the CU, a UE context setup or modification response message including information on a downlink transport layer and information on a general packet radio service tunneling protocol-tunnel endpoint identifier (GTP-TEID) at the first IAB node.

2. The method of claim 1, further comprising:
   receiving, from the CU of the donor node, a radio resource control (RRC) message including address information of the first IAB node and the BAP address of the DU of the donor node.

3. The method of claim 1, further comprising:
   transmitting, to a second IAB node, a first message including polling indication information; and
   as a response to the first message, receiving, from the second IAB node, a second message including information on a routing identity (ID) and information on an available buffer size per the routing ID.

4. The method of claim 3,
   wherein the routing ID includes a backhaul adaptation protocol (BAP) address of the destination receiving node on the BAP layer and an ID of a transmission path.

5. The method of claim 3, further comprising:
   receiving, from
   the CU of the donor node, identification of a backhaul radio link control (BH RLC) channel used for a transmission of the second message.

6. The method of claim 1, further comprising:
   receiving, from the CU of the donor node, identification of a backhaul radio link control (BH RLC) channel used for a transmission of a second message.

7. A first integrated access and backhaul (IAB) node in a multi-hop network, the first IAB node comprising:
   at least one transceiver; and
   at least one processor operably coupled to the at least one transceiver, wherein the at least one processor is configured to:
   receive, from a central unit (CU) of a donor node, a user equipment (UE) context setup or modification request message including information on a backhaul adaptation protocol (BAP) address of a distributed unit (DU) of the donor node, via which downlink data of the first IAB node is transmitted, wherein the DU of the donor node is a destination receiving node for uplink data on a BAP layer from the first IAB node; and
   transmit, to the CU, a UE context setup or modification response message including information on a downlink transport layer and information on a general packet radio service tunneling protocol-tunnel endpoint identifier (GTP-TEID) at the first IAB node.

8. The first IAB node of claim 7,
   wherein the at least one processor is further configured to:
      receive, from the CU of the donor node, a radio resource control (RRC) message including address information of the first IAB node and the BAP address of the DU of the donor node.

9. The first IAB node of claim 7, wherein the at least one processor is further configured to:
   transmit, to a second IAB node, a first message including polling indication information; and
   as a response to the first message, receive, from the second IAB node, a second message including information on a routing identity (ID) and information on an available buffer size per the routing ID.

10. The first IAB node of claim 9,
    wherein the routing ID includes a backhaul adaptation protocol (BAP) address of the destination receiving node on the BAP layer and an ID of a transmission path.

11. The first IAB node of claim 9, wherein the at least one processor is further configured to:
    receive, from the CU of the donor node, identification of a backhaul radio link control (BH RLC) channel used for a transmission of the second message.

12. The first IAB node of claim 7, wherein the at least one processor is further configured to:
    receive, from the CU of the donor node, identification of a backhaul radio link control (BH RLC) channel used for a transmission of a second message.

* * * * *